United States Patent
Tonogai et al.

(10) Patent No.: US 8,483,374 B1
(45) Date of Patent: *Jul. 9, 2013

(54) PROVISIONING AN INTERNET PROTOCOL (IP) PHONE

(75) Inventors: Dale C. Tonogai, Los Altos, CA (US); Allan J. Naim, Sunnyvale, CA (US); Scott Van Gundy, Los Gatos, CA (US)

(73) Assignee: Shoretel, Inc., Sunnyvale, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 13/077,914

(22) Filed: Mar. 31, 2011

Related U.S. Application Data

(63) Continuation of application No. 10/409,703, filed on Apr. 7, 2003, now Pat. No. 7,945,036.

(51) Int. Cl.
*H04M 3/42* (2006.01)

(52) U.S. Cl.
USPC ............ 379/201.12; 379/201.01; 379/201.02; 379/201.03; 379/201.05; 379/207.11

(58) Field of Classification Search
USPC ............ 379/201.12, 201.01, 201.02, 201.03, 379/201.05, 207.11, 207.13, 219; 455/556.1; 370/352, 353
See application file for complete search history.

(56) References Cited

U.S. PATENT DOCUMENTS

| | | | |
|---|---|---|---|
| 5,517,563 A | 5/1996 | Norell | |
| 5,588,051 A | 12/1996 | Berkowitz et al. | |
| 5,689,553 A | 11/1997 | Ahuja et al. | |
| 5,742,596 A | 4/1998 | Baratz et al. | |
| 5,953,389 A | 9/1999 | Pruett et al. | |
| 5,999,525 A | 12/1999 | Krishnaswamy et al. | |
| 6,141,341 A | 10/2000 | Jones et al. | |
| 6,252,952 B1 | 6/2001 | Kung et al. | |
| 6,330,598 B1 | 12/2001 | Beckwith et al. | |
| 6,546,095 B1 | 4/2003 | Iverson et al. | |
| 6,580,710 B1 | 6/2003 | Bowen et al. | |
| 7,328,255 B2 | 2/2008 | Ooki | |
| 7,433,710 B2 * | 10/2008 | Bodnar et al. | 455/556.1 |
| 7,945,036 B1 | 5/2011 | Tonogai et al. | |
| 2001/0026545 A1 | 10/2001 | Matsumoto et al. | |
| 2002/0094073 A1 | 7/2002 | Falkoff et al. | |
| 2002/0178267 A1 | 11/2002 | Ooki | |
| 2003/0235182 A1 | 12/2003 | McMullin | |
| 2004/0023641 A1 | 2/2004 | Tsutsumi et al. | |
| 2004/0185825 A1 | 9/2004 | Preiss et al. | |

OTHER PUBLICATIONS

"Provisioning a Phone Without Involving an Administrator" filed as U.S. Appl. No. 10/409,703 on Apr. 7, 2003 by Dale C. Tonogai et al., pp. 96.

(Continued)

*Primary Examiner* — Thjuan K Addy
(74) *Attorney, Agent, or Firm* — Silicon Valley Patent Group LLP; Omkar Suryadevara

(57) ABSTRACT

An Internet Protocol (IP) phone transmits on a network, an IP packet comprising a dynamically-assigned IP address. A computer associated with the network uses the dynamically-assigned IP address in the packet to identify a specific site to which the IP phone belongs and/or a specific local area network (LAN) to which the IP phone is connected. Then, data to be used to provide telephony service to the phone is recorded in a memory. In some embodiments, the computer associates the IP phone with a dialing plan unique to the specific site, wherein the dialing plan includes an area code to be used by the IP phone.

41 Claims, 20 Drawing Sheets

OTHER PUBLICATIONS

Office Action dated Jul. 3, 2007 in U.S. Appl. No. 10/409,703, pp. 10.
Amendment dated Nov. 5, 2007 in U.S. Appl. No. 10/409,703, pp. 22.
Office Action dated Jan. 28, 2008 in U.S. Appl. No. 10/409,703, pp. 12.
Amendment dated Apr. 24, 2008 in U.S. Appl. No. 10/409,703, pp. 28.
Office Action dated Aug. 7, 2008 in U.S. Appl. No. 10/409,703, pp. 10.
Amendment dated Nov. 7, 2008 in U.S. Appl. No. 10/409,703, pp. 22.
Office Action dated Feb. 10, 2009 in U.S. Appl. No. 10/409,703, pp. 12.
Amendment dated May 9, 2009 in U.S. Appl. No. 10/409,703, pp. 29.
Office Action dated Jul. 20, 2009 in U.S. Appl. No. 10/409,703, pp. 12.
Amendment Oct. 20, 2009 in U.S. Appl. No. 10/409,703, pp. 17.
Final Office Action dated Feb. 4, 2010 in U.S. Appl. No. 10/409,703, pp. 13.
Amendment dated Mar. 26, 2010 in U.S. Appl. No. 10/409,703, pp. 26.
Notice of Allowance dated Apr. 14, 2010 in U.S. Appl. No. 10/409,703, pp. 6.
Amendment dated Jun. 30, 2010 in U.S. Appl. No. 10/409,703, pp. 20.
Office Action dated Jul. 20, 2010 in U.S. Appl. No. 10/409,703, pp. 9.
Amendment dated Oct. 20, 2010 in U.S. Appl. No. 10/409,703, pp. 20.
Notice of Allowance dated Jan. 5, 2011 in U.S. Appl. No. 10/409,703, pp. 4.
Margulies, E., "The UnPBX", Flatiron Publishing, Inc., New York, Jul. 1997, Chapter 7, pp. 7-16 through 7-22.
Spoonhower, D. et al. "Design and Evaluation of an Extensible Web & Telephony Server based on the J-Kernel", Technical Report 98-1715, Department of Computer Science, Cornell University, Nov. 1998, http://www.cs.cornel.edu/slk/papers/tr98-1715.pdf, pp. 14.
Jiang, W. et al. "Towards Junking the PBX: Deploying IP Telephony", NOSSDAV'01, Jun. 25-27, 2001, Port Jefferson, New York, pp. 9.
"A Primer on the H.323 Series Standard", DataBeam, May 15, 1998, pp. 18.
Rosenberg, J. et al. "SIP: Session Initiation Protocol", Jun. 2002, http://tools.ietf.org/html/rfc3261, pp. 265.
Arango, M. et al. Media Gateway Control Protocol (MGCP), Oct. 1999, http://www.ietf.org/rfc/rfc2705.txt?number=2705, pp. 126.
Chapter 11 in "Cisco CallManager System Guide", believed to be prior to the filing date of Apr. 7, 2003, pp. 4.
Chapter 11 in "Cisco CallManager Administration Guide", believed to be prior to the filing date of Apr. 7, 2003, pp. 8.
Postel, J. "User Datagram Protocol", Aug. 28, 1980, http://www.freesoft.org/CIE/RFC/768/index.htm, pp. 3.

* cited by examiner

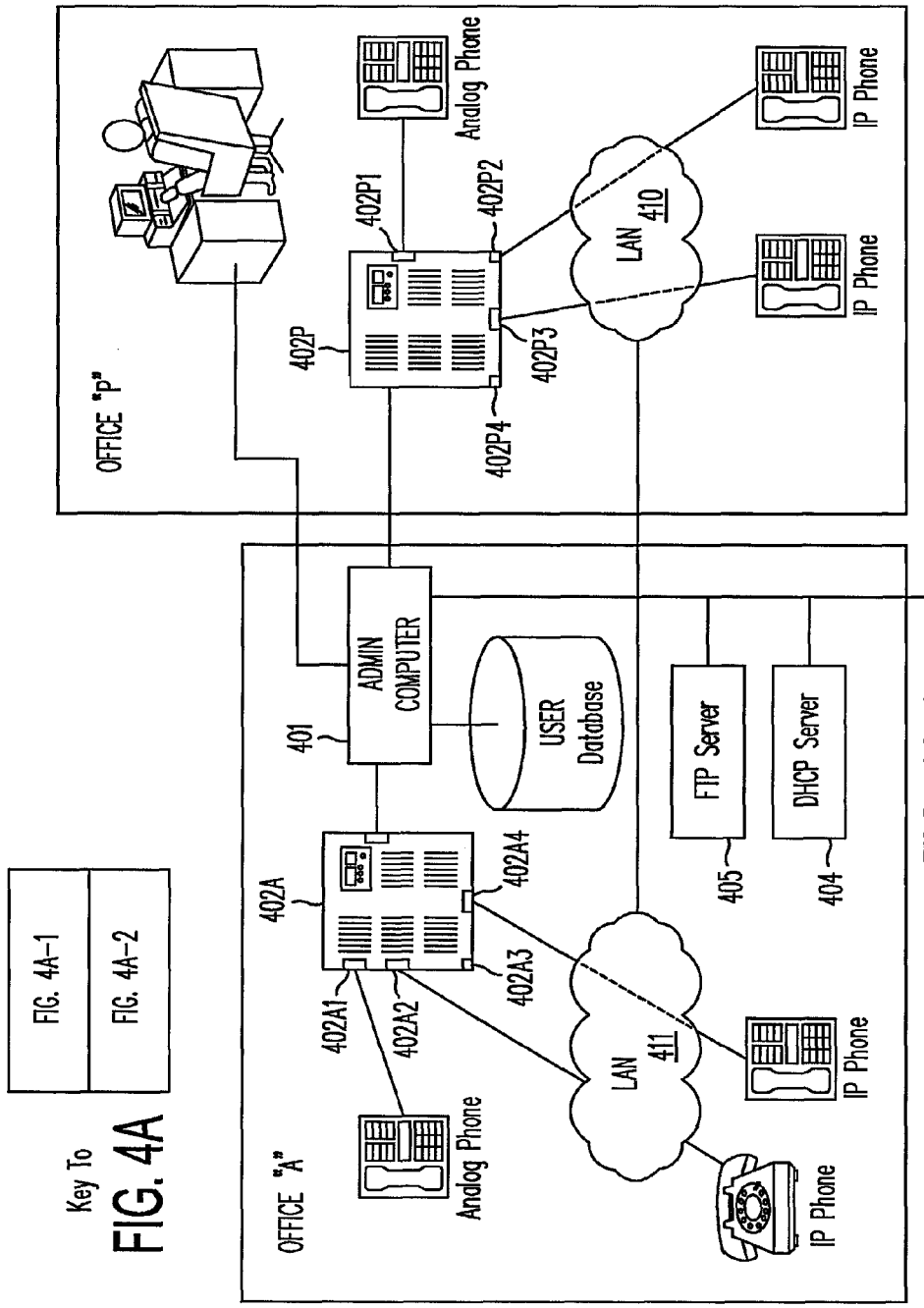

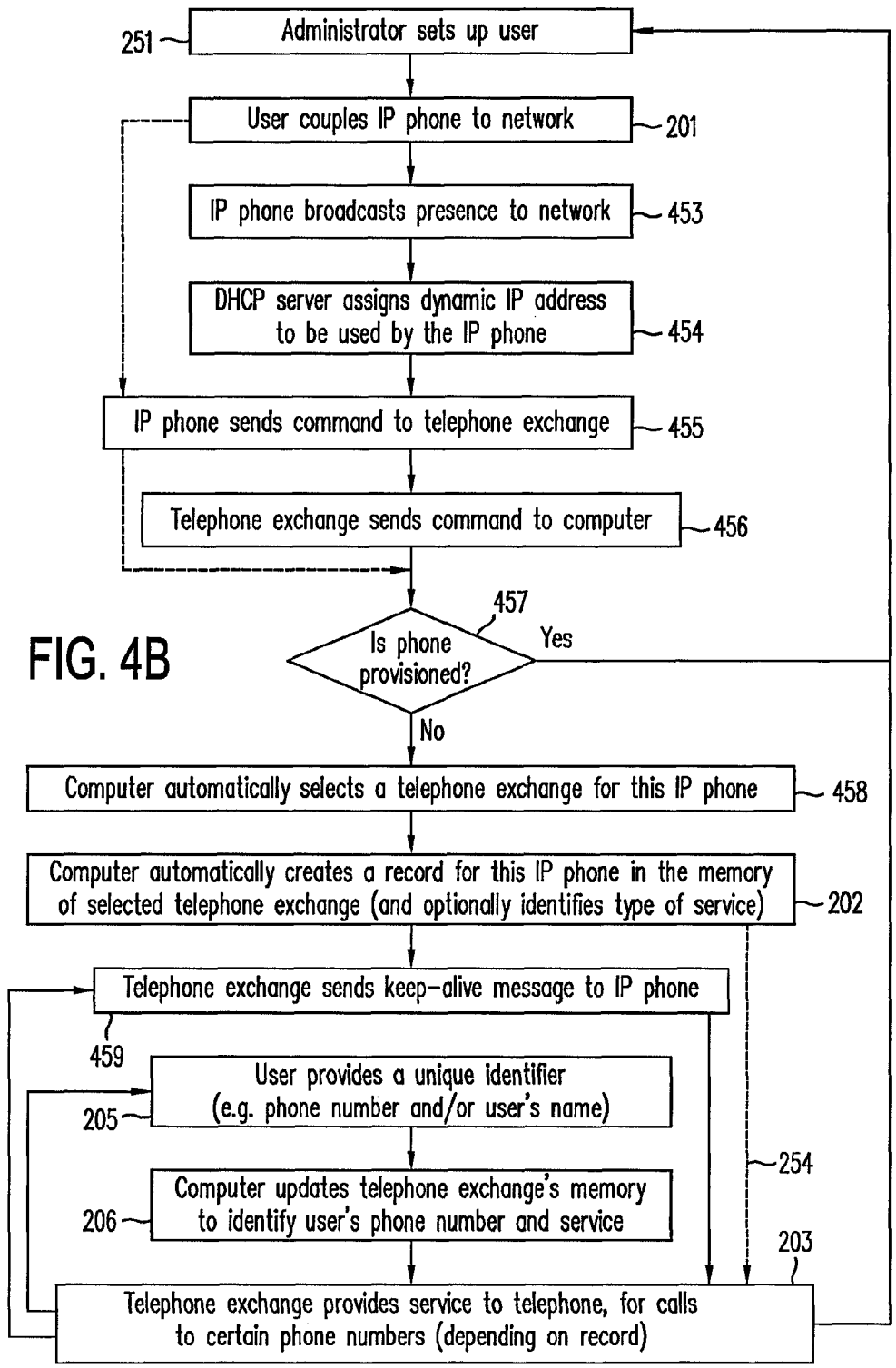

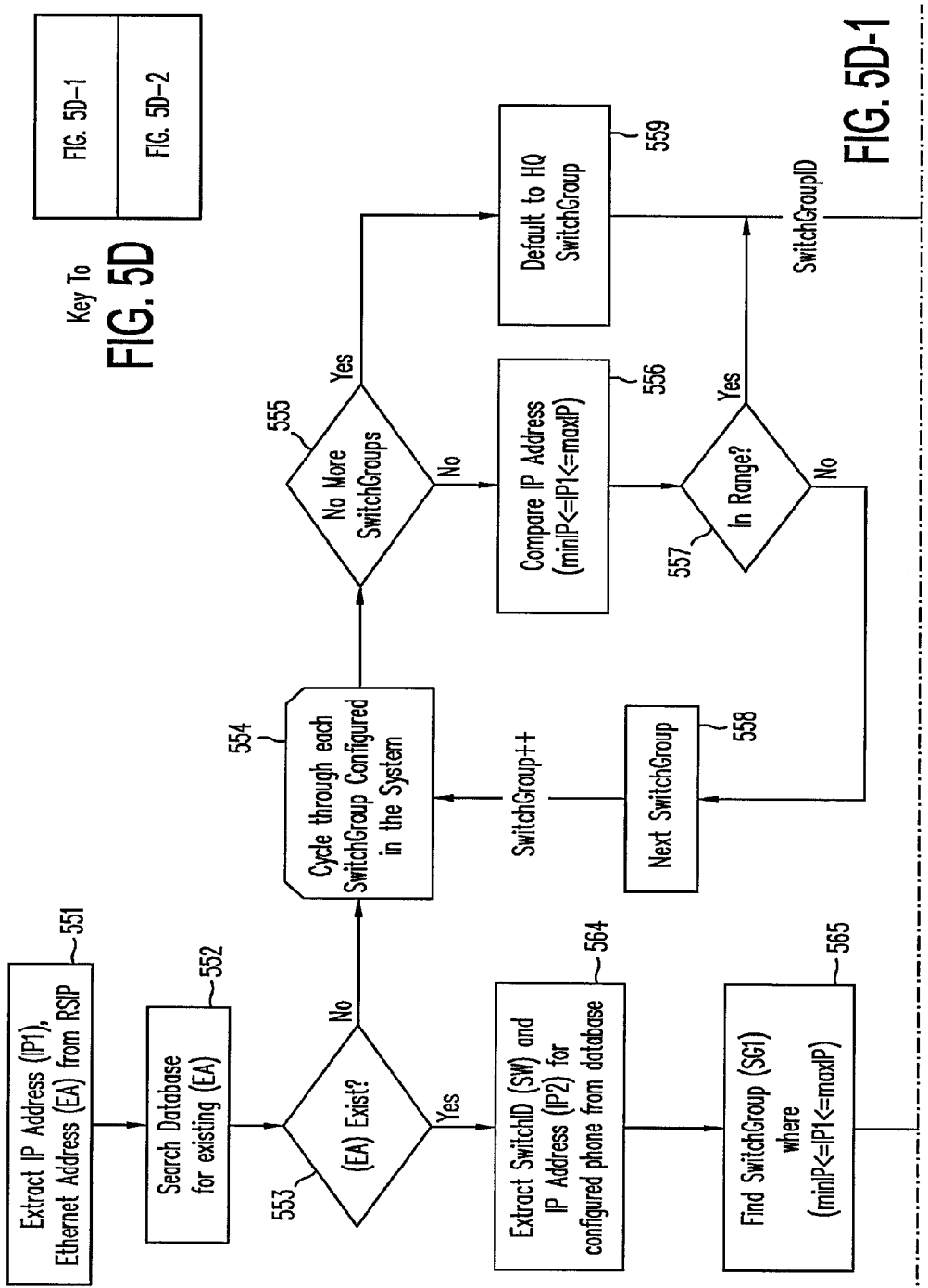

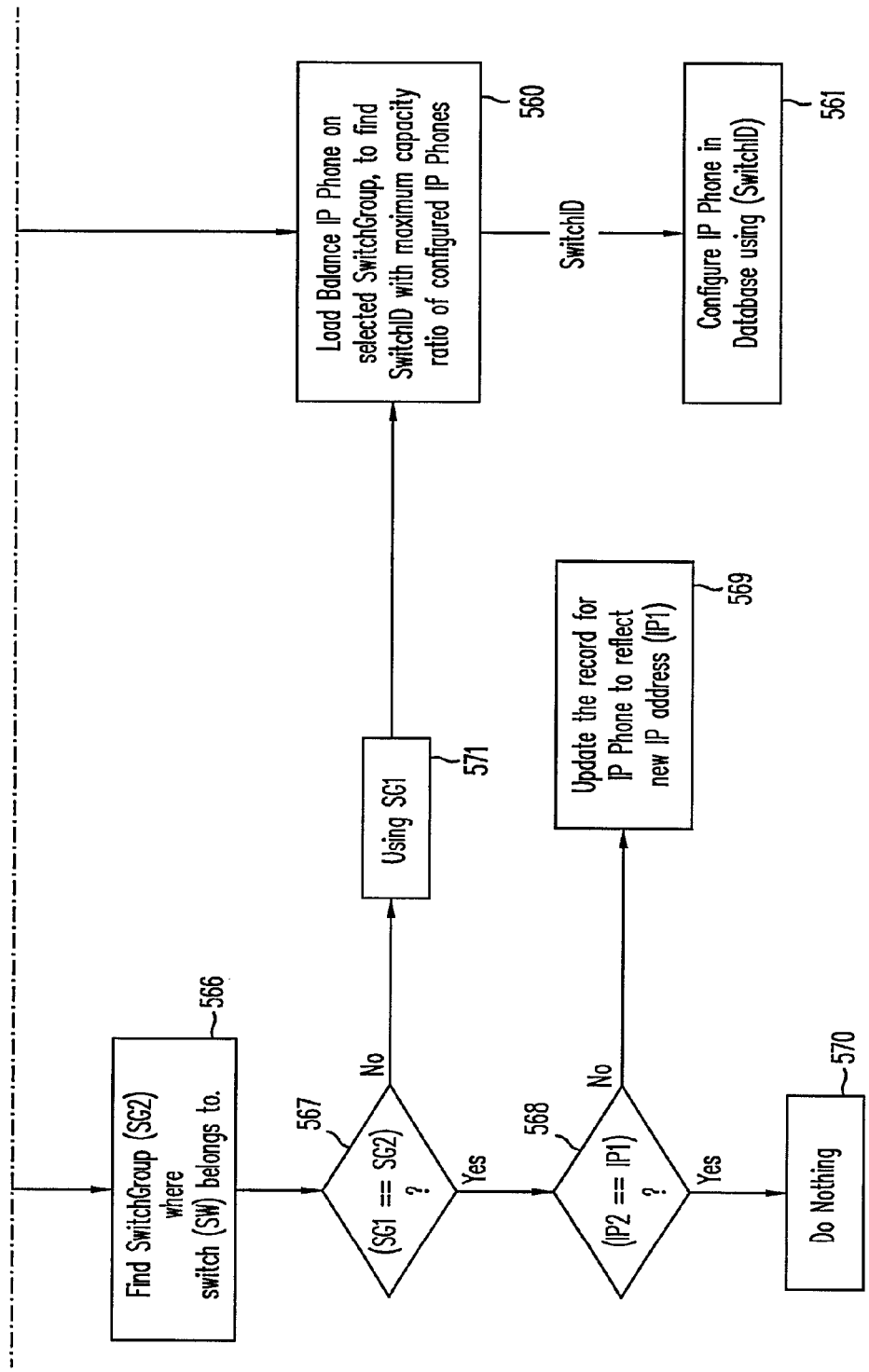

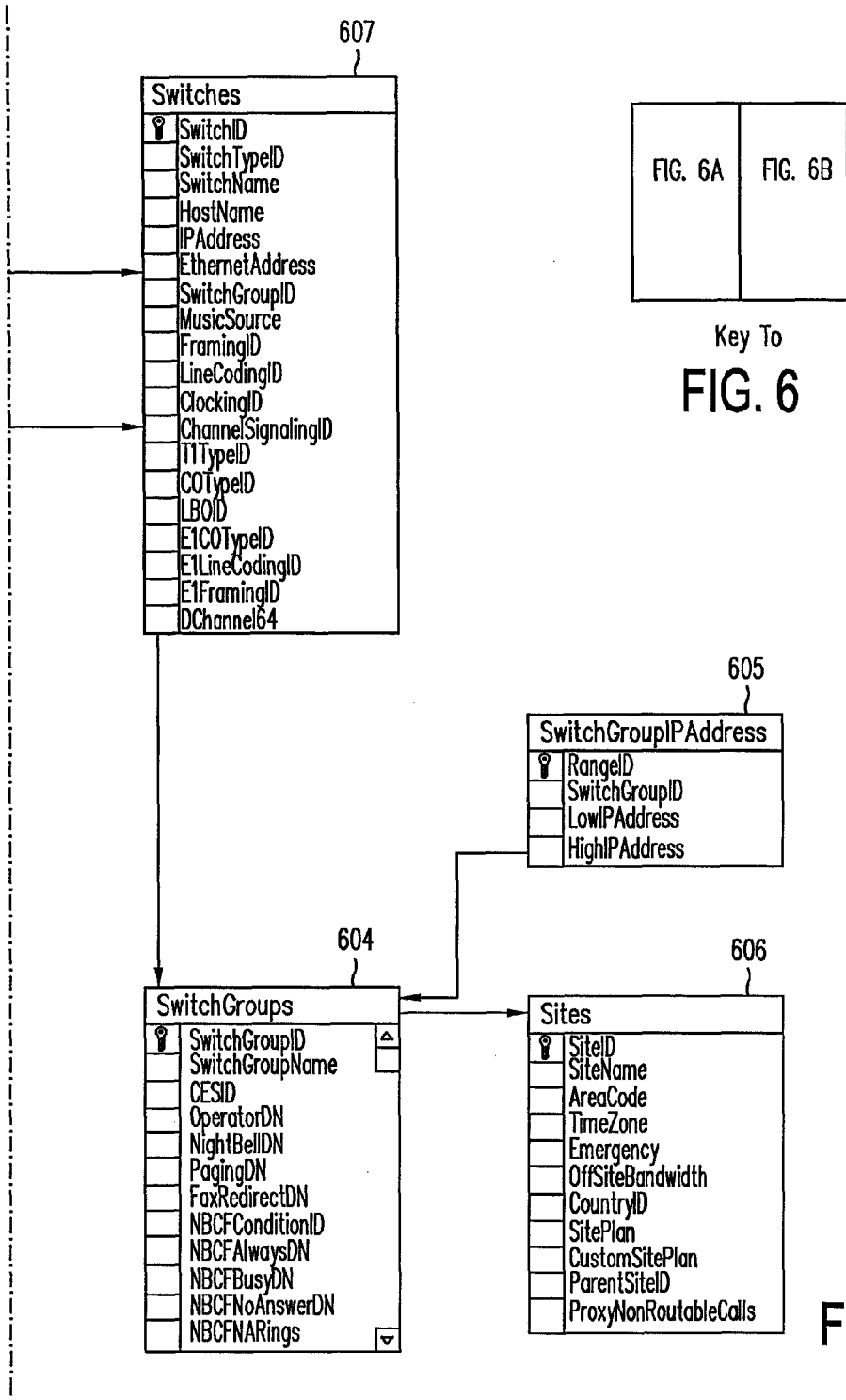

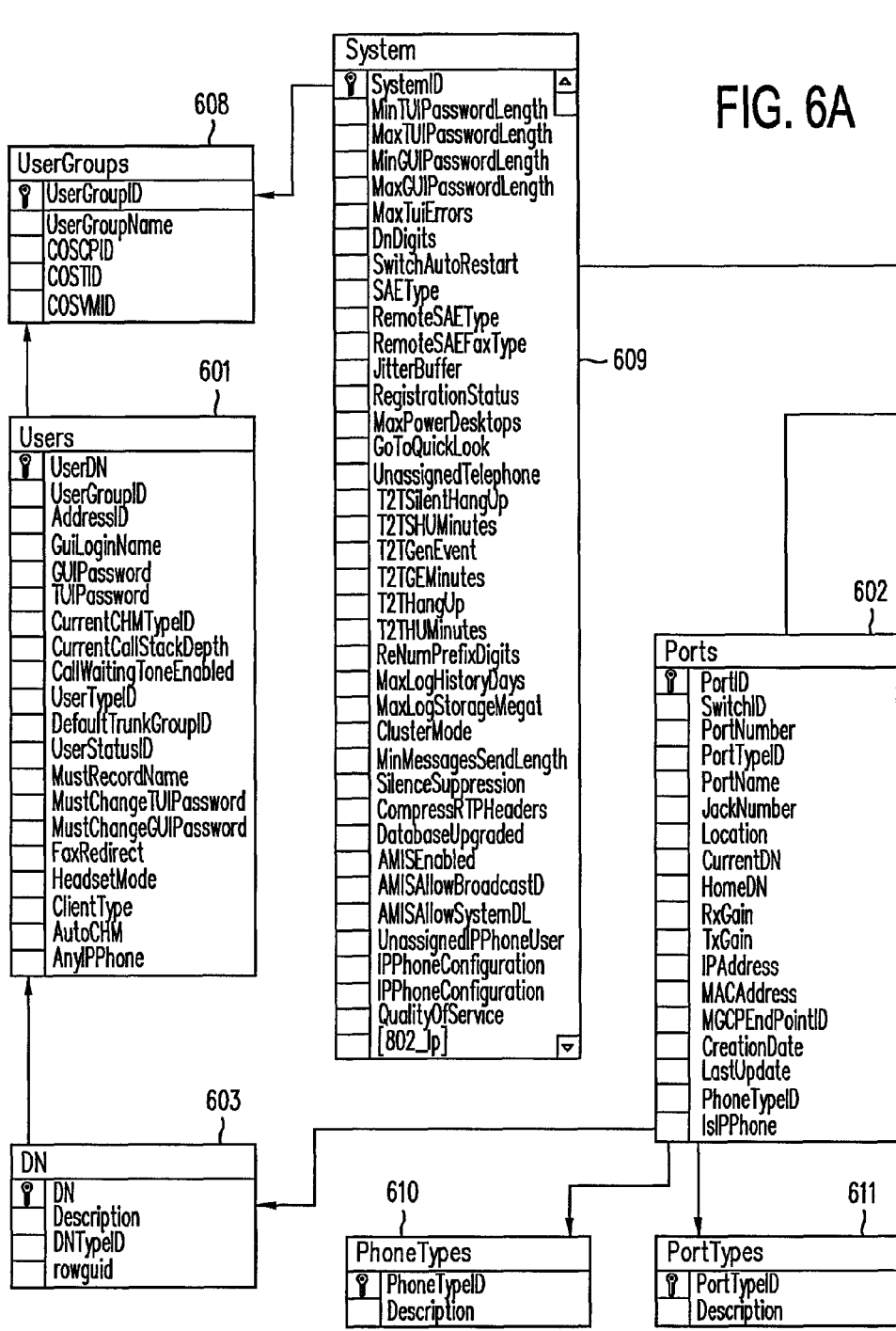

PROVISIONING AN INTERNET PROTOCOL (IP) PHONE

CROSS-REFERENCE TO PARENT APPLICATION

This application is a continuation application of U.S. patent application Ser. No. 10/409,703 entitled "Provisioning A Phone Without Involving An Administrator" filed on Apr. 7, 2003 now U.S. Pat. No. 7,945,036 by Dale C. Tonogai, Allan J. Naim, and Scott Van Gundy. U.S. patent application Ser. No. 10/409,703 is incorporated by reference herein in its entirety, including all appendices therein.

CROSS-REFERENCE TO COMPUTER PROGRAM LISTING APPENDIX

Note that a computer program listing Appendix A originally filed in U.S. patent application Ser. No. 10/409,703 (see above) is hereby expressly incorporated by reference herein in its entirety.

Appendix A contains the following file in IBM-PC format and compatible with MS-Windows, submitted electronically, which forms a part of the present disclosure and this appendix A is incorporated by reference herein in its entirety.

| Date | Time | Size | File Name |
|---|---|---|---|
| Apr. 4, 2003 | 03:57p | 39,946 | SOURCE.TXT |

The file of Appendix A contains source code of computer programs for an illustrative implementation of the present invention.

Specifically, the file SOURCE.TXT contains definitions and functions which describe operation of a computer, a telephone exchange, and a telephone in accordance with certain embodiments of the invention.

CROSS-REFERENCE TO ATTACHED APPENDICES B & C

Appendices B and C which are attached below (as pages 59-65 and 66-70 respectively) just before the claims contain documentation related to one specific exemplary embodiment in accordance with the invention. Appendices B and C are integral portions of the present disclosure and are incorporated by reference herein in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND

Telephone exchanges of the prior art may be located in house at a subscriber's office, or in a remote terminal, or in a central office of a telephony service provider. Such a telephone exchange normally interconnects one telephone to another telephone if directly connected to both telephones, and connects any directly connected telephone to an outside telephone network (also called wide area network abbreviated as "WAN"). Conventional telephone exchanges normally support analog phones (that require circuit-switching), although recently a telephone may also be used to place and receive voice over Internet Protocol (VoIP)-based telephone calls and public switched telephone network (PSTN)-based telephone calls, as described in, for example, U.S. Pat. No. 6,141,341 granted to Jones, et al. that is incorporated by reference herein in its entirety. Internet Protocol (IP) based telephony is also described in, for example, U.S. Pat. No. 6,252,952 granted to Kung, et al. and U.S. Pat. No. 5,742,596 granted to Baratz, et al. each of which is incorporated by reference herein in its entirety.

Telephone exchanges that are located in a subscriber's office (called private branch exchanges, abbreviated as "PBX") typically perform various telephone management functions, such as call transfer, call forwarding, speed dialing, music on hold, last number re-dial, 3-way conferencing, call blocking, call accounting, as well as integrating voice mail systems, and facsimile machines, although such functions may also be provided by telephone exchanges located in the central office (also called "central office switch"). An example of a packet-switching PBX is described in, for example, "Intranet and IP-Based UnPBXs," Chapter 7, pages 7-16 to 7-22 in the book entitled "the UnPBX" edited by Edwin Margulies, Flatiron Publishing, Inc. 1997 that is incorporated by reference herein in its entirety.

See also, the article entitled "Design and Evaluation of an Extensible Web & Telephony Server based on the J-Kernel" by Daniel Spoonhower et al., Technical Report 98-1715, Department of Computer Science, Cornell University, November 1998 available on the Internet at http://www.cs.cornell.edu/Info/People/chichao/tr1715.pdf that is incorporated by reference herein in its entirety. Another article entitled "Towards Junking the PBX: Deploying IP Telephony" by Wenyu Jiang, et al. NOSSDAV '01, Jun. 25-27, 2001, Port Jefferson, N.Y., is also incorporated by reference herein in its entirety. Telephone exchanges for IP phones may conform to any of the following protocols: H.323, SIP and MGCP. These protocols are well known in the art and are described at the following webpages:

For H.323 protocol:
http://www.itu.int/rec/
recommendation.asp?type=folders&lang=e
&parent=T-REC-H.323
For SIP protocol:
http://www.ietf.org/rfc.html
see RFC 2543bis
For MGCP protocol:
http://www.ietf.org/rfc.html
see RFC 2705bis Traditionally, before a phone is used with a PBX or with a central office switch, one or more parameters that govern telephony-related services to be provided to a user of the phone must be specified by a human (hereinafter "administrator"). Specifically, before a user receives any telephony-related service (hereinafter simply "service") at a phone, the administrator associates a telephone number (unique within the telephone exchange) with a port of the telephone exchange to which the phone is coupled, only then does the telephone exchange route calls to the phone (using this association). An administrator manually performs this association (in a process called provisioning) at a computer for managing the telephone exchange (which may be called, for example, "Operations Support System" abbreviated as OSS). Such a computer may also be known as, for example, Headquarters Server.

During provisioning, the administrator typically also performs other tasks, such as enabling voice mail service for calls to the port that are not answered, enabling access from the port to the WAN, and enabling access from the port to various services such as speed calling, call waiting, and call forwarding services. Information provided by the administrator is typically stored in a record of a database which contains a number of such records, one per port. After creation of such a record, the full range of services that are provisioned (including dial tone) are activated (in a process called "service activation"), e.g. by appropriately configuring the telephone exchange. Thereafter, as soon as a phone is coupled to the newly-provisioned port, the phone is provided with access to the enabled services. In such systems, a user cannot receive any service until after their port has been provisioned, and service activated.

U.S. Pat. No. 5,588,051 granted to Berkowitz et al (which is incorporated by reference herein in its entirety) describes associating unsubscribed lines with the same telephone number and same switch line termination point. The unsubscribed lines may be inexpensively provisioned with soft dial tone thereby allowing a potential telephone subscriber to interactively subscribe to and activate telephone service from an unsubscribed line. Soft dial tone is also known in the art as limited access dial tone, left-in dial tone, quick serve, or warm line service. Since soft dial tone is not a billed service, calls directed to the unsubscribed telephone line are blocked at the central office switch. The application of soft dial tone may be used to identify a network access endpoint that is being used by a customer, and thus improve the accuracy of the contents of databases used by the operations facility in the provisioning of telephone service by identifying incorrect data.

U.S. Pat. No. 5,953,389 granted to Pruett et al (which is incorporated by reference herein in its entirety) describes receiving a service request from a customer at a living unit requesting service, and determining if the service request is eligible for processing by an adjunct processor. When eligible, the method automatically provisions customer equipment to execute the service request based on customer identification data and customer facilities.

A reference called "Cisco CallManager System Guide" describes, in Chapter 11, a method called "Auto-Registration" that automatically assigns directory numbers to new devices as they connect to the IP telephony network. Auto-registration is to be used if the administrator wants Cisco CallManager to assign directory numbers automatically to new phones when the phones are plugged into the network. Since a directory number is assigned to a new device, it appears (to the inventors) that phone calls can be received at the new device.

Cisco's CallManager disables auto-registration by default. Enabling auto-registration carries a security risk in that "rogue" phones can automatically register with Cisco CallManager. Accordingly, it is suggested by Cisco that auto-registration should be enabled only for brief periods when the administrator wants to perform bulk phone adds. After a new device has been auto-registered, Cisco requires an administrator to assign a user to the new device, via a graphical user interface.

SUMMARY

A phone is provisioned in some embodiments of the invention, in a two step process without involving an administrator. Specifically, in a first step, as soon as a new phone is coupled to a network, a computer coupled to the network automatically provisions the phone without any human involvement. After the first step and before performance of a second step, the phone is only partially provisioned. Such a partially-provisioned phone can be used in the normal manner but only to make calls and not to receive calls. Also, depending on the embodiment, there may be no other services available at a partially-provisioned phone (i.e. other than to make calls).

Later, in a second step, in certain embodiments, a user identifies himself or herself at the partially-provisioned phone, and the computer responds by associating the partially-provisioned phone with the user, thereby to complete the provisioning. Therefore, after the second step, the phone is fully provisioned (i.e. the phone can now be used to both receive calls as well as make calls). Some embodiments require that the user must have been provisioned into the computer prior to the second step, although this is not required in other embodiments. If a user has in fact been provisioned before the second step, then any additional services that were enabled for that user (e.g. voice mail) are now made available to the user, at the fully provisioned phone.

In some embodiments, during the first step, the computer automatically records the existence of the phone in a memory of a telephone exchange. After the first step, the above-described telephone exchange uses its memory in the normal manner, to provide telephony-related services for all calls being made from the partially-provisioned phone. Moreover, after the first step, there is no support (in the telephone exchange) for calls to be received at the partially-provisioned phone, at least because a phone number has not yet been associated with the partially-provisioned phone. Such a partially-provisioned phone is sometimes referred to herein as an "anonymous" phone because there is no phone number associated with the partially-provisioned phone. Due to lack of a phone number associated with an anonymous phone of certain embodiments, the anonymous phone is un-dialable from another phone.

As noted above, service that is initially provided after the above-described first step, to an anonymous phone, may be limited. Due to the limitation on service, any concern about security in which "rogue" phones are provisioned is minimized. Specifically, if a "rogue" phone is provisioned, then the only service it receives is limited as noted above. Moreover, such a "rogue" phone is an anonymous phone and therefore the telephone exchange alerts a person receiving a phone call that the call originated at an anonymous phone (e.g. if caller id is enabled). In some examples, the limited service that is provided automatically after the first step is similar or identical to soft dial tone service wherein the anonymous phone can be used only to place calls to a limited set of phone numbers (e.g. long-distance calls are typically blocked, while 911 calls are typically permitted).

The service (provided by the telephone exchange) at such an anonymous phone after the above-described first step may be enhanced by performance of the above-described second step. Specifically, in the second step, several embodiments of the invention require a user of the anonymous phone to provide (e.g. via the phone) certain information that identifies that particular user. For example, some embodiments require the user to manually provide a phone number (e.g. an extension number in case of a PBX) to be used by others in making calls to that particular phone. In response to user input during the second step, the user's phone number is automatically recorded in the telephone exchange's memory (as being associated with that particular phone), thereby to enable the telephone exchange to route (to that particular phone) all calls that are made to the phone number. Such a phone, after the second step of provisioning, is sometimes referred to herein as a "personalized" phone.

During the second step, depending on the embodiment, the user's phone number (and/or the user's name) may also be used by the computer to automatically identify and enable in the telephone exchange, one or more additional features (e.g. long distance calling, 3-way conferencing, display of caller's identity) which may have been previously associated with the user (i.e. during user provisioning). Specifically, prior to the just-described personalization of an "anonymous" phone, several embodiments require an administrator to provision the user, i.e. identify the user's phone number (and optionally any enhanced services to be provided to the user). Therefore, in these embodiments, the computer creates a database record and stores therein some personal information about the user (e.g. the user's login name and password to be used with a voice mail server), prior to the above-described second step of personalization of the phone by the user.

As noted above, in some embodiments, the user must be already provisioned by the time the user performs the second step to personalize their phone. Such embodiments may not require the user to remember and provide their phone number during personalization of their phone, as long as the user identifies himself/herself in a unique manner (sufficient to identify their personal record). For example, in one embodiment, the user is merely required to provide the user's login name and password that are to be used with voice mail, and the computer automatically looks up their personal record (during the second step) to obtain a phone number that was previously assigned to this user, and then associates this phone number to the user's phone (thereby to complete the user's personalization of their phone).

Moreover, depending on the embodiment, provisioning of a user can be performed at any time relative to coupling of a phone to the network. Specifically, in some embodiments, the user is provisioned prior to the user plugging in the phone into the network, whereas in alternative embodiments the user is provisioned only after the user has plugged in their phone into the network. In several such alternative embodiments, the user may be required to make a call from their partially-provisioned phone before it can be completely provisioned. Note that the call the user makes in such alternative embodiments may be either to the administrator or to an automated attendant, and after authentication of the user the above-described second step of personalization of the anonymous phone (including selection of a phone number to be associated with the phone) is permitted.

Also, although in some embodiments, user provisioning by an administrator must be performed prior to personalization of an anonymous phone by the user, this order can be reversed in alternative embodiments. In several such alternative embodiments, the user provisioning is not done by the administrator prior to personalization of an anonymous phone by the user and instead, the user uses an anonymous phone from a desk they plan to use, and presents a proposal for personalization and the administrator approves a user's proposed personalization of their phone.

Furthermore, although in some embodiments, a phone number is assigned to a user during user provisioning, in an alternative embodiment, a phone number may be assigned to the user during personalization of their phone (e.g. after a user has authenticated himself/herself (e.g. via user name and password) to a computer that can alter a record in the telephone exchange, the computer selects a phone number from a list of available phone numbers, and assigns the selected phone number to the user (and at this time the computer informs the user about their phone number). During selection of the telephone number to be assigned to the user, the computer may interact with the user in the normal manner, in making a selection that may be preferred by the user.

BRIEF DESCRIPTION OF THE DRAWINGS

FIG. 4B illustrates, in an intermediate level flow chart, acts performed in automatically provisioning the IP phone of FIG. 4A.

FIG. 5D illustrates, in a low level flow chart, acts performed by the IP phone configuration service 526 of FIG. 5A which executes in the illustrative programmed computer.

FIG. 6 illustrates schema of a database maintained by the illustrative programmed computer, to hold information related to provisioning of the user.

DETAILED DESCRIPTION

In accordance with the invention, a computer 101 (FIG. 1A) automatically maintains data in memory 102M of a telephone exchange 102, to enable the telephone exchange (also called "switch") to provide telephony service to phones 103A-103N (wherein A≦I≦N, N being the total number of such phones) that are coupled to telephone exchange 102. Specifically, telephone exchange 102 has in memory 102M (also called "switch memory") the data 105I for each phone 103I, and the data identifies at least the service to be provided to each phone 103I.

Figure 1A:
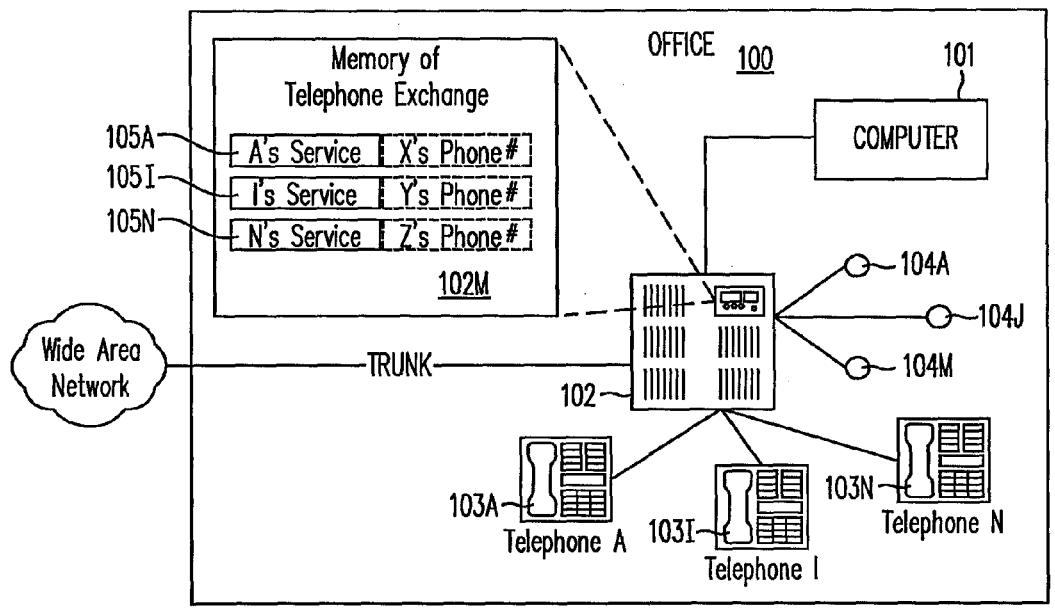
FIGS. 1A-1D illustrate, in high level block diagrams, automatic provisioning of a phone in a memory of a telephone exchange in accordance with the invention, and servicing of the newly-coupled phone by the telephone exchange.

Telephone exchange 102 can provide any one of a number of different levels of service to each phone 103I, and data 105I identifies the service to be provided (e.g. telephone I's service may be set to toll-free service in which case only toll-free calls can be made). As shown in FIG. 1A, data 105I may also identify a user's phone number that is associated with phone 103I. When a call is made to a specific user (e.g. by dialing their individual phone number), telephone exchange 102 uses such data to route calls to the associated phone.

As used herein, the word "phone" covers a telephone instrument that communicates via different media depending on the embodiment, such as an analog phone that communicates over a twisted pair (and provides only Plain Old Telephone Service), a cellular phone that communicates over a wireless network, and an Internet Protocol (IP) phone that communicates over Ethernet. Moreover, the word "phone" also covers a telephone instrument that uses different media for interacting with the user depending on the embodiment, such as an audio phone and a video phone.

Note that in one specific embodiment, data 105I for each phone object in a switch includes IP Address and Ethernet address. Certain embodiments may have, in addition to the IP Address and the Ethernet address, another field which contains a phone type although this additional field does not exist in other embodiments. In some embodiments, the IP address of an IP phone is used to provision the phone on the appropriate site, and the Ethernet address of the IP phone is used as a unique identifier for the phone in a database that contains configuration information.

Figure 1B:
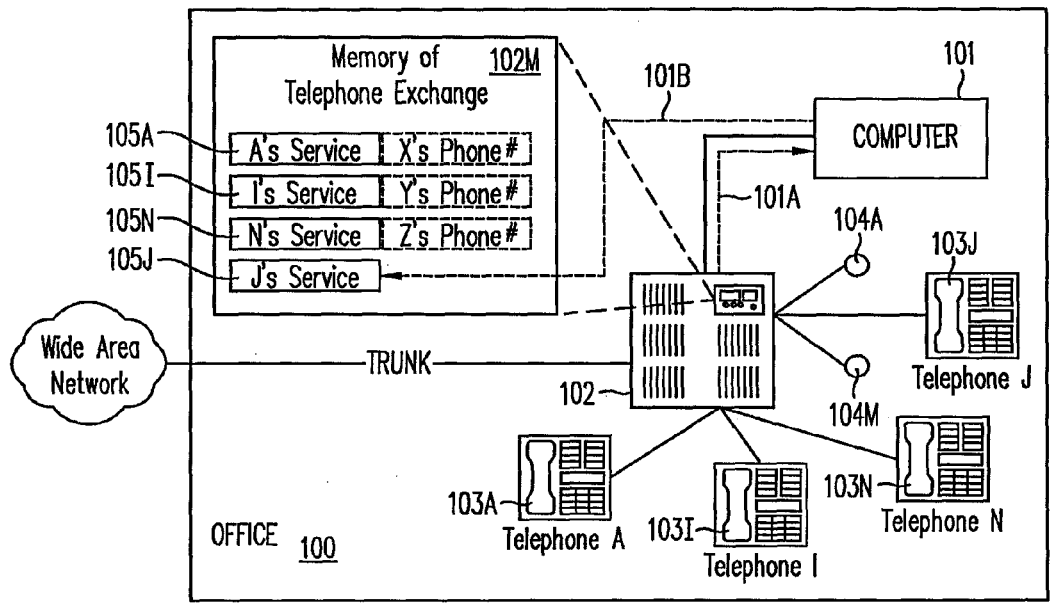

Telephone exchange 102 is coupled to a number of sockets 104A-104M (wherein A≦J≦M, M being the total number of such sockets) that are not connected to any phone, and that are available to support M new phones. Note that at this stage, since sockets 104A-104M are not connected to a phone, there is no corresponding data in memory 102M (because no calls can originate and/or terminate at sockets 104A-104M). However, as soon as a phone 103J (FIG. 1B) is coupled to a socket 104J (FIG. 1A) as illustrated by act 201 in FIG. 2A, computer 101 (when programmed in accordance with the invention) automatically becomes aware of the existence of phone 103J (as illustrated by a signal 101A that is received by computer 101). In response, computer 101 automatically records existence of phone 103J (as per act 202 in FIG. 2A) in telephone exchange memory 102M.

For example, computer 101 may generate certain default data 105J and supply the data to be stored in memory 102M for use in providing telephony service for phone 103J (as illustrated by a signal 101B that is transmitted by computer 101). Therefore, automatic provisioning of phone 103J requires that memory 102M hold certain default data 105J for phone 103J which data is in addition to previously stored data 105A-105N. Addition of data 105J to telephone exchange memory 102M is performed automatically, as soon as phone 103J is coupled to socket 104J, and without involvement of an administrator. Therefore, in certain embodiments, when a new phone 103J is coupled to switch 102, a first step of provisioning occurs when computer 101 automatically provisions the phone in switch memory 102M.

After such provisioning without involvement of an administrator, phone 103J may be used to make calls in the normal manner (but not to receive calls). Specifically, telephone exchange 102 uses its memory 102M in the normal manner, to provide telephony-related services to all phones 103A-103N (including automatically provisioned phone 103J). Therefore, from this point in time, telephone exchange 102 uses data 105J to enable phone 103J (as illustrated by act 203 in FIG. 2A) to make calls. However, depending on data 105J in memory 102M, service that is initially provided to phone 103J at this stage is limited, as discussed next.

At this stage, telephone exchange 102 does not yet support calls to be made to automatically provisioned phone 103J, at least because a phone number has not yet been associated with phone 103J (i.e. not identified in data 105J). For this reason, at this stage, phone 103J is only partially provisioned, and is therefore referred to as a partially-provisioned phone. Moreover, at this stage phone 103J is also sometimes referred to herein as an "anonymous" phone because there is no phone number associated with the phone (and of course no user). Even though anonymous phone 103J cannot receive calls, note that telephone exchange 102 has provisioned phone 103J into the system automatically, for example with no or very minimal human intervention. Therefore, calls can be now made from partially-provisioned phone 103J.

Figure 1C:
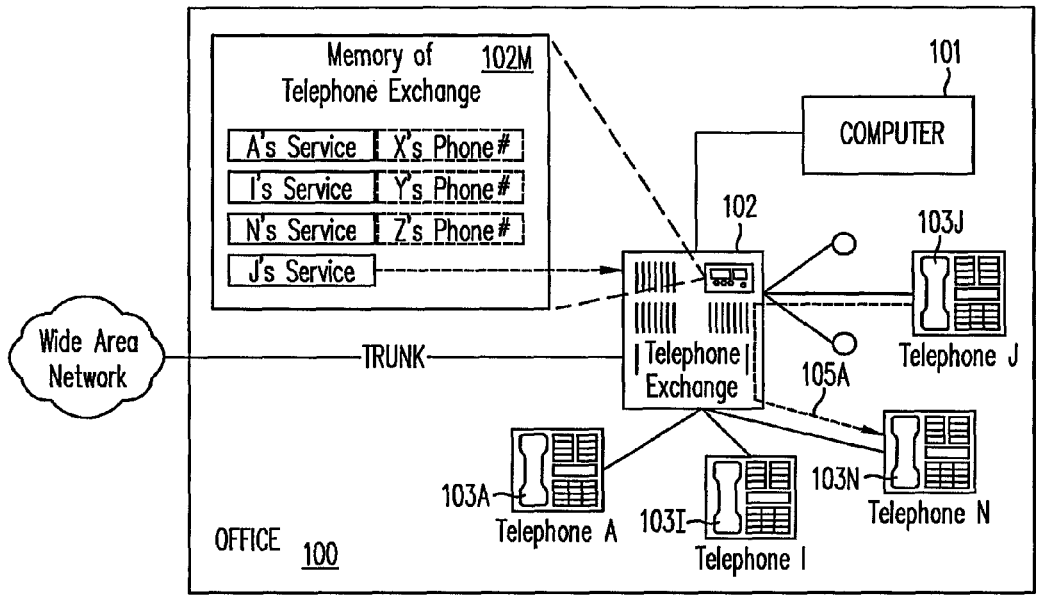
Figure 1D:
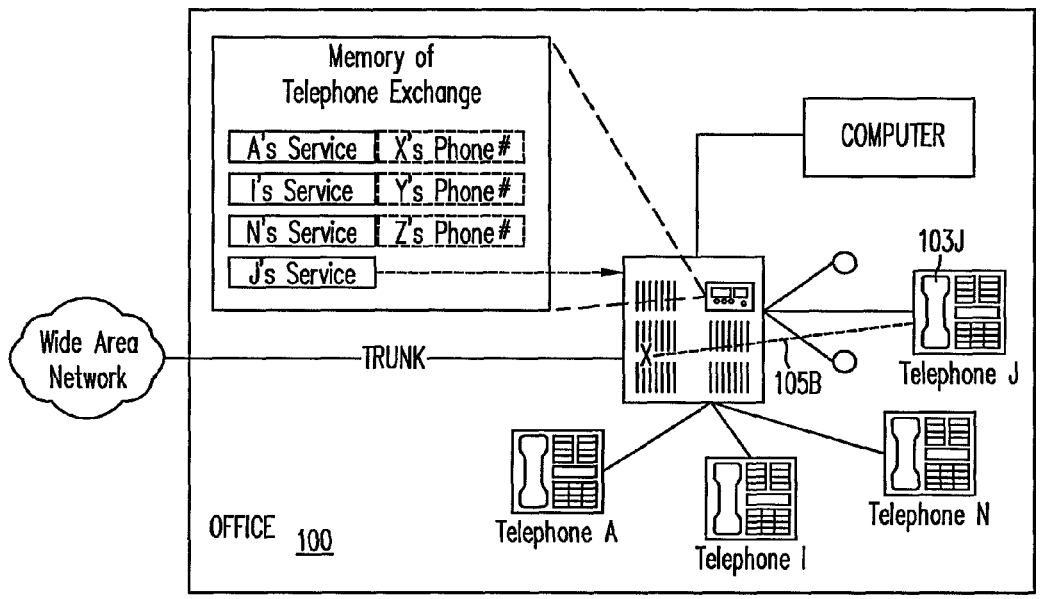

In some examples, data 105J that is automatically supplied by computer 101 (on plugging phone 103J into socket 104J) identifies only a basic service wherein the partially provisioned phone 103J can be used only to place calls to a limited set of phone numbers (e.g. long-distance calls are typically blocked, while 911 calls are typically permitted), similar or identical to soft dial tone service. Therefore, phone 103J can be used to make a phone call to any of phones 103A-103N (except to itself and to any other automatically provisioned phone). FIG. 1C illustrates by signal 105A, the use of phone 103J to make a call to phone 103N. Moreover, FIG. 1D illustrates with signal 105B that phone 103J cannot be used to make a long distance call.

Thereafter, the above-described acts may be repeated as often as necessary (as illustrated by act 207 in FIG. 2A), thereby to automatically provision a number of additional phones, e.g. one for each of the available sockets. Note that no manual intervention is required in the first step (i.e. nothing needs to be done by the user and also nothing needs to be done by the administrator) to automatically provision phones into a partially-provisioned state as soon as the phones are coupled to telephone exchange 102. Such elimination of manual steps in provisioning a phone provides savings in time and costs, and allows for "plug and play" use of telephone exchange 102.

Although telephone exchange 102 is shown in FIG. 1A as being coupled to each phone 103I and each socket 104J by a single line in a star topology, such a topology is not required in several embodiments. Specifically, it will be apparent to the skilled artisan that a network of any topology (or even a wireless network with no topology) can be used to connect telephone exchange 102 to phones 103A-103N. Moreover, depending on the embodiment, phones 103A-103N and sockets 104A-104M can be coupled to telephone exchange 102 by any communication network, including a voice network and/or data network or some combination thereof. Furthermore, such a network can be implemented as a telephony network, a cable TV network, a local area network, or a wireless network.

Furthermore, although all items are illustrated in FIG. 1A as being located at a single location, in an office 100 (in which case telephone exchange 102 may be referred to as a private branch exchange abbreviated as "PBX"), such items may be dispersed in different locations depending on the embodiment. For example, phones 103A-103N and sockets 104A-104M can be located at the office, whereas telephone exchange 102 may be located in the central office.

Data 105A-105N in memory 102M may be organized in any manner, e.g. the data may be held in arrays of data structures, and/or objects (combinations of data and logic), and/or linked lists, and/or hierarchical databases and/or relational databases, or any other organization that would be apparent to the skilled artisan in view of the disclosure. In certain embodiments, a record for holding data 105J is automatically created in memory 102M by telephone exchange 102 in response to commands from computer 101, although in other embodiments the existence of phone 103J may be recorded in memory 102M in other ways.

Data 105J that is added when provisioning a phone contains information related to telephony, e.g. a phone number and/or the user's level of telephony service that is provided to the phone. For this reason, data 105J is different from, for example, a record containing an IP address that may be created by a DHCP server when a modem is provisioned in the prior art. Note that in some embodiments data 105J may contain, for example, the following items of information that are normally not maintained by a DHCP server: the users configured in the system, all sites the system spans, switches, phone ports, and user preferences.

Figure 2A:
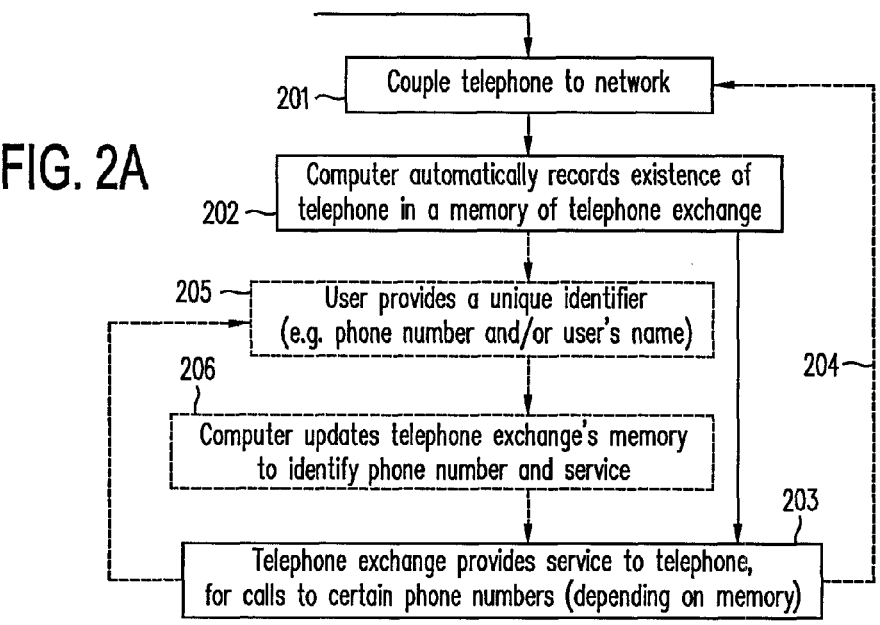
FIG. 2A illustrates, in a high level flow chart, acts performed during automatic provisioning of a phone in several embodiments of the invention.
Figure 2B:
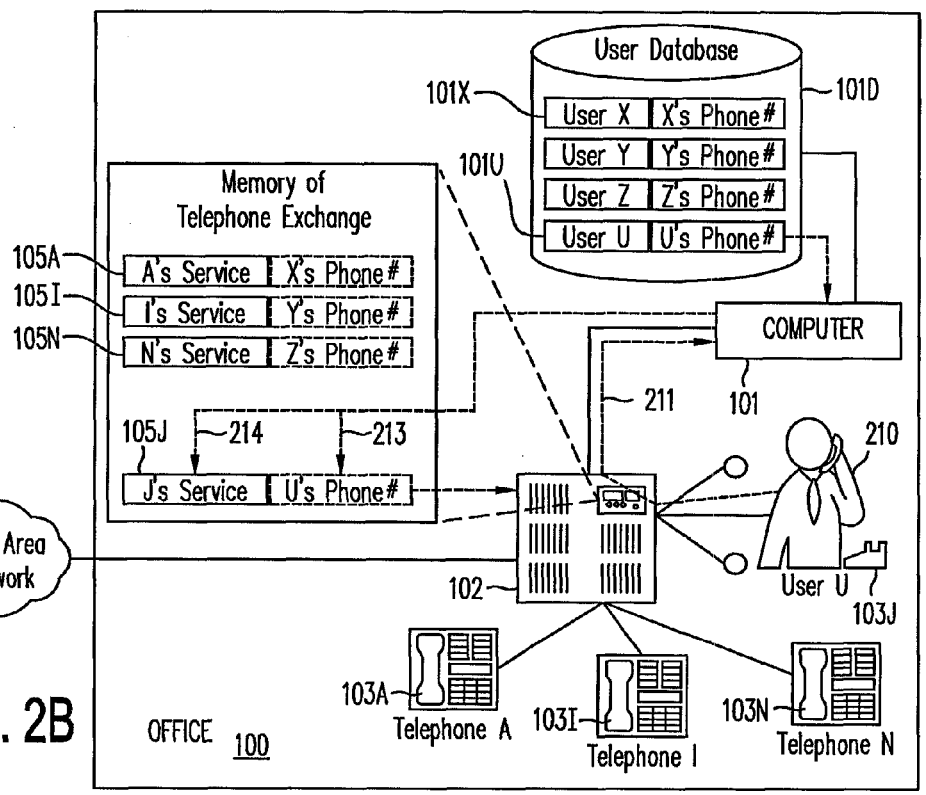
FIGS. 2B-2D illustrate, in high level block diagrams, personalization of an automatically provisioned phone by a user, and enhancement in service provided by the telephone exchange, for the embodiments of FIG. 2A.

To enhance the basic service (provided by telephone exchange 102) to an anonymous phone 103J, several embodiments of the invention require each user to operate their phone (after coupling to the network) to provide information that uniquely identifies the user (as illustrated by act 205 in FIG. 2A). This is the second step in a two step process of provisioning a phone in accordance with the invention. For example, user 210 (FIG. 2B) may be required to use their phone to dial a predetermined sequence of numbers (e.g. press the "9" button three times) followed by the user's phone number, during the second step. This user-supplied information is used by computer 101 (as illustrated by signal 211) to complete the provisioning of phone 103J.

Note that although a simple sequence is described in the previous paragraph for user 210 to initially identify their phone to computer 101 during personalization of phone 103J, in other embodiments, user 210 may be required to provide (e.g. to an interactive voice response (IVR) application (also called "auto attendant") that executes in computer 101) the user's login name and the password that have been assigned for use with voice mail.

Such use of IVR enhances security. In several embodiments, signal 211 is implemented via a phone call between telephone 103J and computer 101, and the IVR is implemented to provide to user 210 voice prompts that are similar (or identical) to prompts of the voice mail application. When providing information for personalization of anonymous phone 103J, user 210 may operate the phone 103J using any input mechanism well known in the art, such as a button, a wheel, a touch screen, a mouse, a trackball and a microphone.

On receipt of such information which uniquely identifies the user (e.g. in the form of the user's phone number), computer 101 updates data 105J in memory 102M (as illustrated by act 206 in FIG. 2A) to associate the user 210's phone number with phone 103J (see signal 213 in FIG. 2B) and at the same time computer 101 may add user 210's name and phone number to a directory listing (if not previously added), so that other users can look up user 210's phone number. In addition, computer 101 may upgrade the service for user 210 (see signal 214 in FIG. 2B), to a service better than the basic service.

In certain embodiments, on completion of provisioning of a phone 103J, computer 101 may also send a signal to phone 103J to inform the user that the phone has now been personalized with that particular user's information. For example, if phone 103J has a display (such as a liquid crystal display "LCD" screen), on receipt of such a signal from computer 101, phone 103J displays the user's name (which could be, for example, the information provided by an operator in fields 351 and 353 in FIG. 3C, or alternatively in field 356 or 358).

When such a signal is played (e.g. via the speaker in the handset) or displayed (e.g. via the LCD screen), the user knows that the provisioning of phone 103J has been completed, and that it happened successfully. Note that depending in the embodiment and the implementation, such a signal may also contain, for example, an extension number assigned to the phone 103J being provisioned. At this stage, phone 103J is enabled to receive calls that are being made to the extension number.

In various embodiments, whether or not there is an upgrade in service during the second step of provisioning (which is also called "personalization") may depend on the user's job function in office 100 (e.g. certain employees, such as executives, may receive an upgrade whereas other employees, such as administrative assistants, may not receive the upgrade).

Figure 2C:
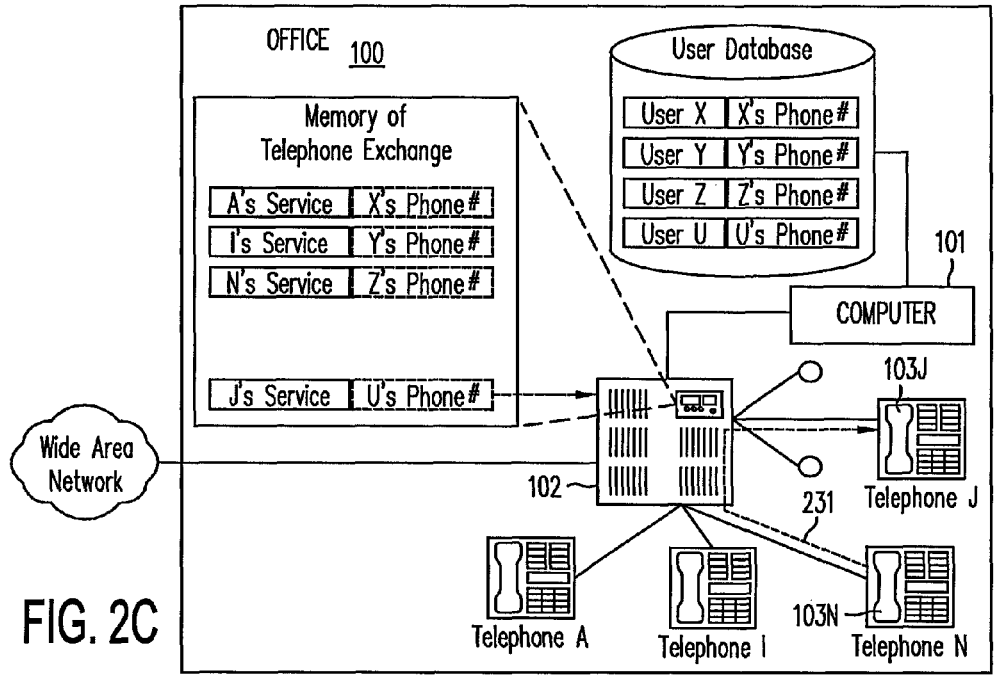
Figure 2D:
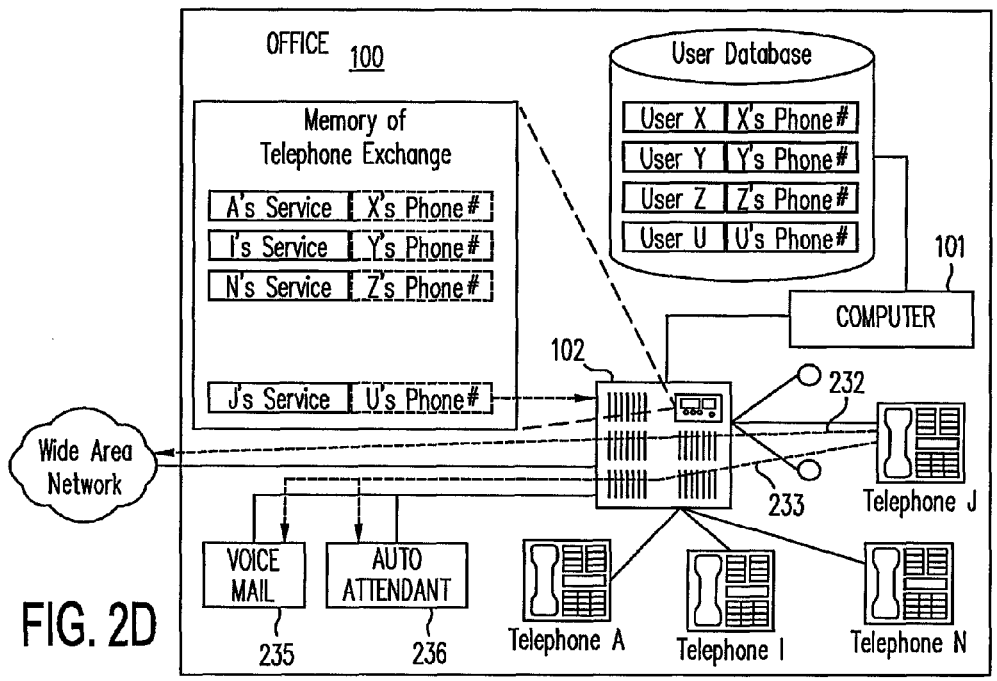

Regardless of service upgrade, as noted above, from this time onwards telephone exchange uses data 105J (that now includes the user's phone number) to support calls from other users to user 210 (as per act 203 in FIG. 2A). For example, signal 231 (FIG. 2C) illustrates a call being made from phone 103N to phone 103J. Depending on data 105J, telephone exchange 102 may provide support for long distance phone calls from phone 103J (as illustrated by signal 232 in FIG. 2D) and allow phone 103J to access voice mail 235 and/or auto attendant 236 (as illustrated by signal 233 in FIG. 2D).

The above-described personalization of an automatically provisioned phone 103J is performed by user 210, without any involvement of an administrator. Note that in several such embodiments, the administrator provisions user 210 (e.g. creates a record for the user and supplies to the user the phone number (e.g. an extension number in case of a PBX) to be used by others in making calls to the user). In some embodiments, the provisioning of user 210 by an administrator is performed prior to the above-described coupling of the phone to the network, whereas in other embodiments such user provisioning is performed subsequent to the coupling but prior to personalization.

Figure 3A:
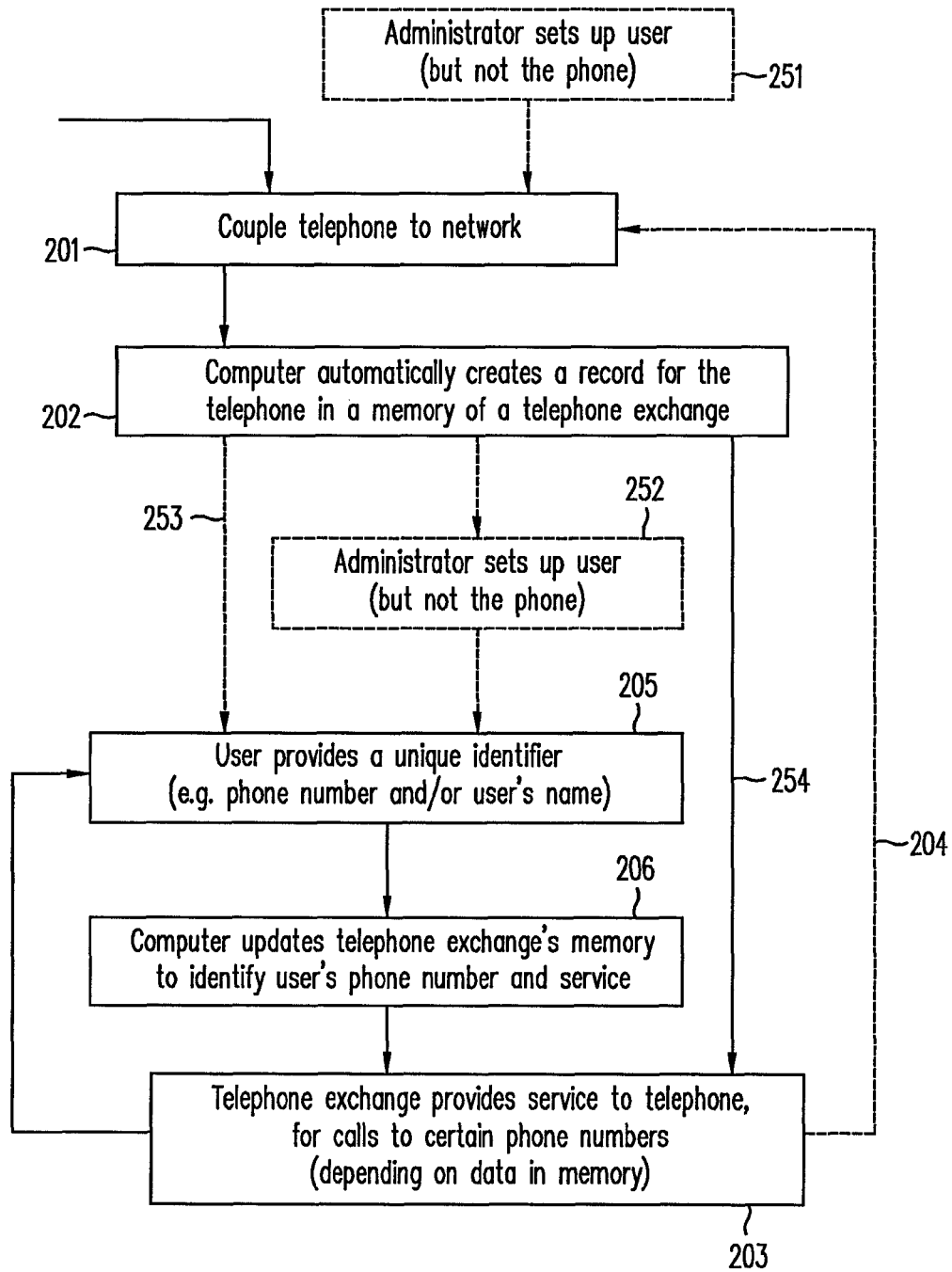
FIG. 3A illustrates, in a high-level flow chart, the manual provisioning performed by an administrator relative to other acts that are preformed in certain embodiments of the invention to automatically provision a phone and to personalize the automatically provisioned phone.
Figure 3B:
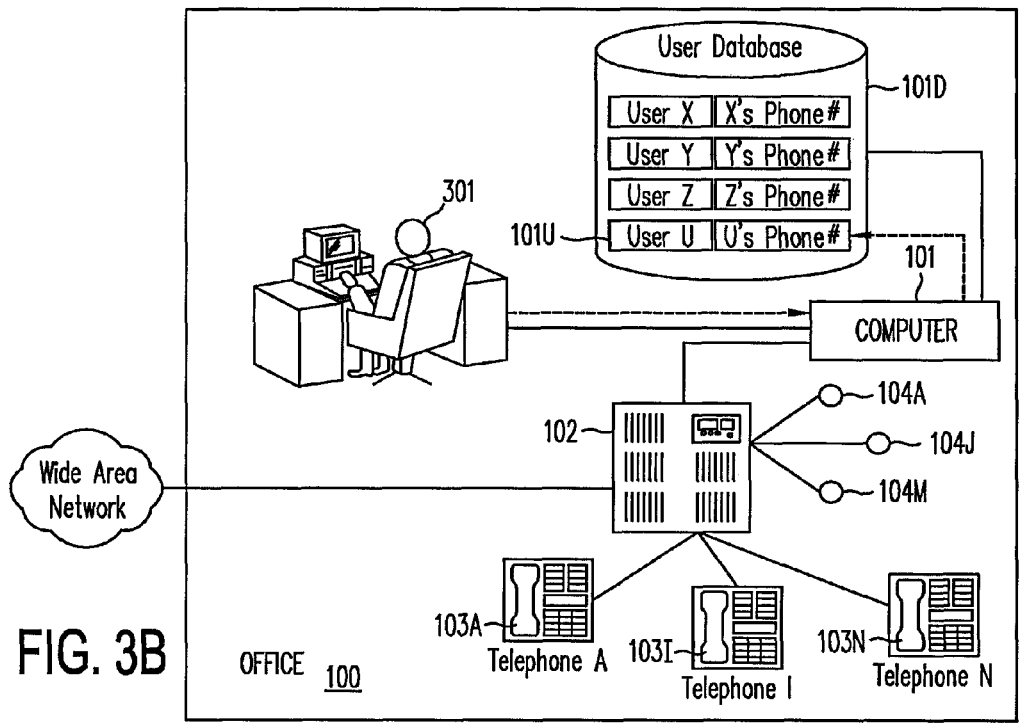
FIG. 3B illustrates, in a high level block diagram, an administrator manually provisioning a user as illustrated in FIG. 3A, and in accordance with the invention not provisioning the phone.

The phone number and enhanced services (if any) for user 210 are identified ahead of time in some embodiments (as per act 251 in FIG. 3A) during the provisioning of user 210 by an administrator 301 (FIG. 3B). In several embodiments, prior to even coupling of phone 103J to the network (in act 201 of FIG. 3A) administrator 301 (FIG. 3B) must associate new user 210 with a phone number (e.g. an extension number in case of a PBX) that is to be used by others in placing calls to user 210. Computer 101 stores the information provided by administrator 301 in a database 101D (FIG. 3B) for holding such information on all users. Specifically, a new record 101U (FIG. 3B) is created for new user 210 (in database 109D shown in FIG. 3B), to hold the information being provided by administrator 301.

Figure 3C:
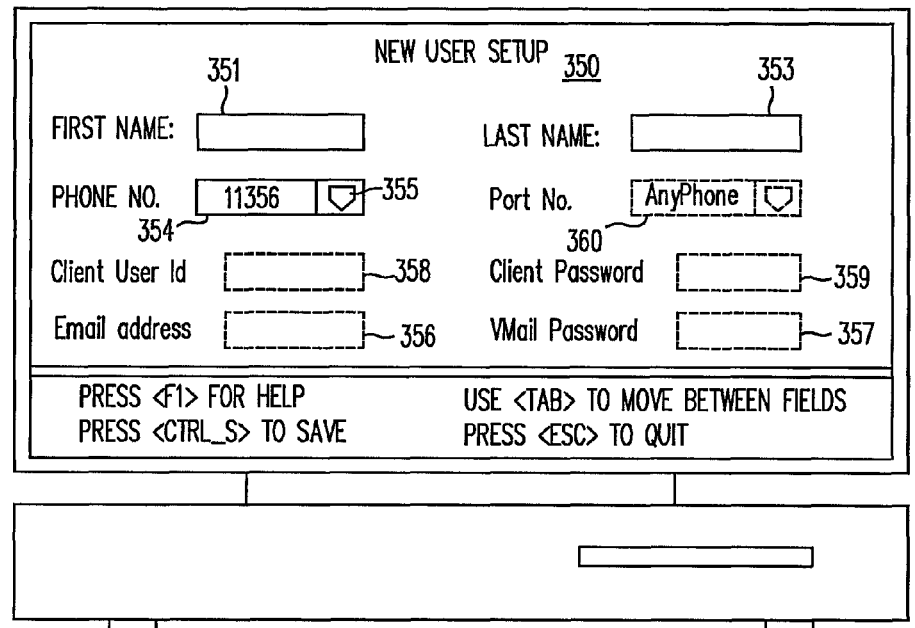
FIG. 3C illustrates, in a block diagram, a screen displayed to the administrator of FIG. 3B when provisioning the user.

Administrator 301 may provide information for provisioning new user 210 via a screen 350 of the type illustrated in FIG. 3C. In certain embodiments, administrator 301 must provide to computer 101 the user's first name (e.g. in field 351), last name (e.g. in field 353), and a telephone number (e.g. in field 354) to be used by others in calling this user. In several embodiments, computer 101 assists administrator 301 in managing the allocation of phone numbers to users, e.g. by providing an optional button 355 on screen 350 that is operable by administrator 301 to display to all available phone numbers, for selection thereof. The number of digits for the phone number that must be identified in field 354 by administrator 301 depends on the individual implementation, e.g. in case of a PBX the number of digits may be 5 (depending on the size of the office) and such digits serve as an internal extension number to be used within office 100.

Although certain embodiments are described and illustrated herein other embodiments will be apparent to the skilled artisan in view of the disclosure. For example, in some embodiments, fields 351 and 353 are replaced by an employee number which is uniquely associated (in a different database) with the employee's name. As another example, in an alternative embodiment fields 351 and 353 are replaced by just the email address, and the email address is displayed (instead of user name) on the telephone's display after it has been provisioned. This display of email address is provided as an alternative. Since all such information is held in a persistent manner in the database, any unique User attribute could be used to identify the user by the applications.

In some embodiments, administrator 301 identifies a user by name, and also associates with the user a phone number to be used. In such embodiments, administrator 301 must also inform user 210 of their assigned telephone number. At this time administrator 301 may request entry of the user name and phone number into a directory listing, or alternatively this may be done automatically (e.g. when the user personalizes their phone). As noted elsewhere herein, when personalizing phone 103J, user 210 must provide at least the phone number to phone 103J, as illustrated by act 205 in FIG. 3A.

Depending on the embodiment, in act 251 (FIG. 3A) administrator 301 may be required to assign to user 210 a client user id in field 358 and a client password in field 359 that are to be used by the user in a telephony application software (e.g. call manager) that enables the user to dial phone numbers via their personal computer. Also depending on the embodiment, in act 251 (FIG. 3A) administrator 301 may be required to assign to user 210 an email address in field 356 for use in their personal computer to receive and send email, and a password in field 357 to be used in accessing voice mail. Administrator 301 must inform user 210 of the information being filled in such fields. Such information is thereafter used by the user and by various applications (e.g. voice mail application) to authenticate user 210.

Note that several embodiments do not assign to a user a login name that is separate and distinct from the user's phone number, e.g. if the phone instruments do not have a graphical user interface (GUI). In such embodiments, the user's phone number itself is used as their login name, and hence field 358 (FIG. 3C) and the associated label "Client User Id" are both not present in screen 350. Furthermore, some embodiments may require assignment of a user to a group that automatically identifies zero or more enhanced services (such as long distance service and 3-way conferencing) to be provided to all users in that group.

Although the above description refers to provisioning of a user by an administrator 301 prior to the automatic provisioning of a phone 103J, as illustrated by act 251, in at least one alternative embodiment, the order is reversed as illustrated by act 252 in FIG. 3A. Specifically, phone 103J is initially provisioned (automatically in act 202) when coupled to the network, and subsequently administrator 301 performs act 252 to provision user 210 (assuming act 251 was not performed). Even though a record for phone 103J is present in database 101D prior to performance of act 252, administrator 301 merely provisions the user in act 252 (in a manner identical to act 251), and does not provision or personalize the phone in such embodiments. Instead, after act 252 is performed, acts 205, 206 and 203 are performed, as discussed above, followed by branch 204 (also discussed above).

Note that although several embodiments described above implement a two-step process (namely automatic provisioning which results in basic service, followed by personalization which results in enhanced service), in some embodiments the two steps are combined into a single step as illustrated by branch 253 in FIG. 3A. Specifically, in such embodiments, act 203 is not performed immediately after act 202 (i.e. branch 254 is not taken). Instead, telephone exchange 102 waits for the memory to be updated to identify the user's phone number and the enhanced services to be provided to the user (as per act 206) and only then does telephone exchange 203 start providing service to telephone 103J. Note that in such a case, when performing act 205, the user does not hear dial tone (and the user may be instructed by administrator 301 to blindly perform the appropriate key sequence at their phone as soon as the phone is plugged in).

In one such example, a visual display on each anonymous telephone shows the word "Available" to indicate that no user is assigned to the phone, and alternatively a provisioned phone displays visually the First and Last Name of a user assigned to the phone. Instead of a visual display, the user may be required to listen and respond to voice prompts which provide instructions to the user as to what needs to be done by the user to provision the phone.

Figures 2, 4A:
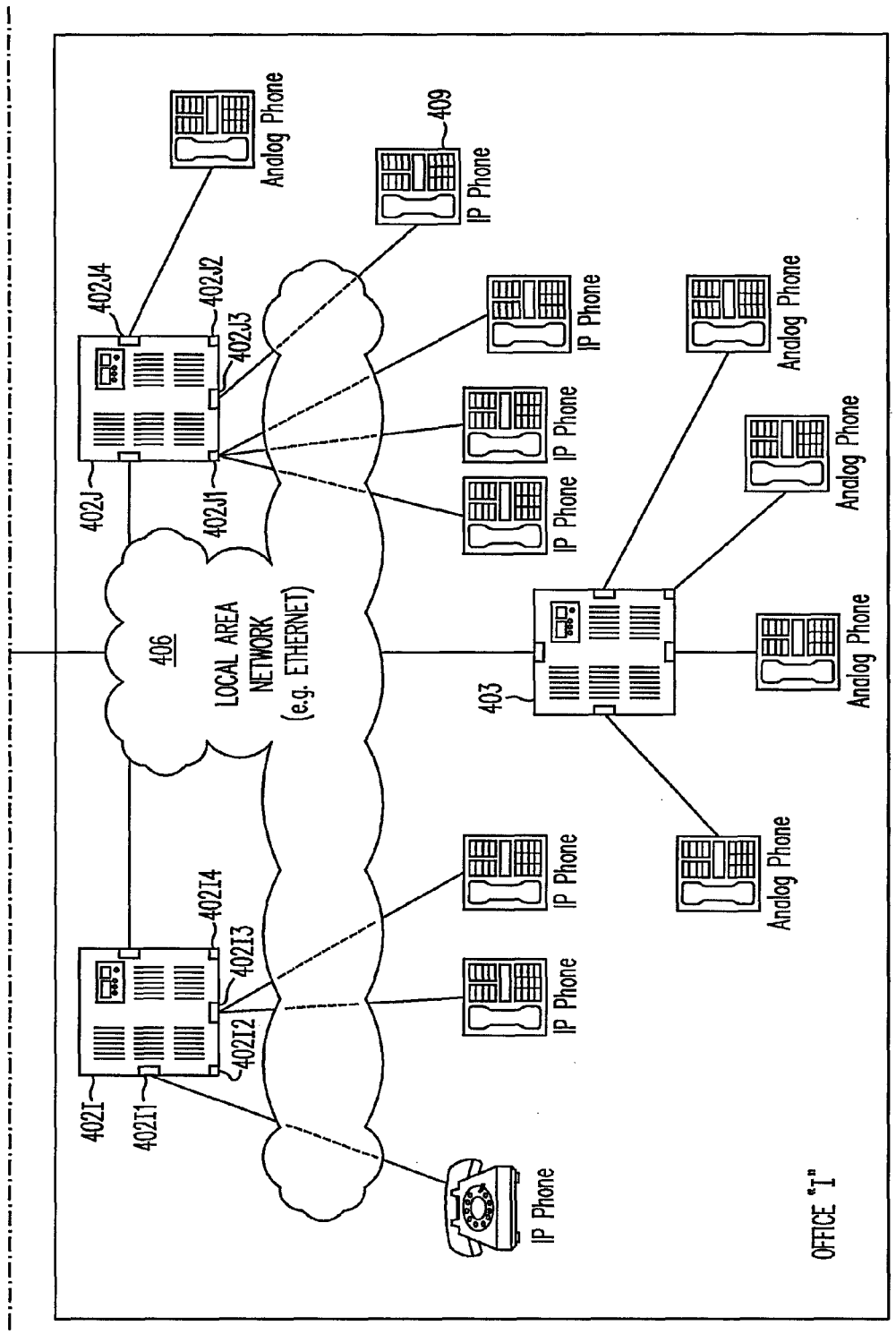
FIG. 4A illustrates, in a high level block diagram, automatic provisioning of an Internet Protocol (IP) phone in certain embodiments that automatically assign the IP phone to one of a number of telephone exchanges.

In an embodiment illustrated in FIG. 4A, a number of phones are digital phones that generate packets in conformance with Internet Protocol (IP). In this embodiment, prior to boot up of a new IP phone 409 that is located in office I (FIG. 4A), acts 251 (user provisioning) and 201 (coupling of IP phone to network) are performed (as per FIG. 4B) in the manner described above in reference to FIG. 3A. Thereafter, IP phone 409 (FIG. 4A) boots up and broadcasts its presence to network 406 (as per act 453 in FIG. 4B). For example, IP phone 409 may send out an Ethernet packet containing its MAC address (which uniquely identifies the IP phone). The just-described packet may conform to a conventional standard, such as Address Resolution Protocol abbreviated as ARP. DHCP server 404 (FIG. 4A) responds to the broadcast by sending a dynamically-assigned IP address to IP phone 409. Note that DHCP stands for Dynamic Host Configuration Protocol, which is an Internet protocol well known in the art.

IP phone 409 of this embodiment hereinafter uses the dynamically-assigned IP address in all IP messages that it generates. Specifically, in act 455 (FIG. 4B), IP phone 409 sends a message to indicate that it is now coming up, to a software entity (commonly known as a "call agent") in a telephone exchange 402I that is to manage calls to and from IP phone 409. Such a software entity is commonly called a "media gateway controller" or a "call agent." IP phone 409 may obtain the IP address of the call agent in any manner depending on the embodiment, e.g. by use of a message from DHCP server 404 or by querying a directory or some combination thereof.

Depending on the embodiment, the IP message that is generated when phone 409 is coming up (also called a "command") may conform to any conventional protocol, such as Media Gateway Control Protocol abbreviated as "MGCP". For more information on MGCP, see the Request For Comment #2705 available on the Internet at http://www.ietf.org/ rfc/rfc2705.txt?number=2705 and incorporated by reference herein in its entirety. Note that instead of using MGCP, other embodiments of phone 409 may use other protocols, such as Session Initiation Protocol (SIP), Session Announcement Protocol (SAP), Real Time Streaming Protocol (RTSP) as defined in RFC 2326 and/or H.323. In certain embodiments that use MGCP, the command message can be, for example, a "RestartInProgress" message, abbreviated as RSIP, although any other IP message from phone 409 can be used to trigger automatic provisioning of phone 409 in the manner described herein. Note that command messages in any formats alternative to MGCP can be used in accordance with the invention, such as SIP, H.323 and Megaco.

In some embodiments, the RSIP message is used by phone 409 to signal to telephone exchange 402I that phone 409 is being taken in or out of service. On receiving the RSIP message, a call agent in telephone exchange 402I checks to see if it is responsible for this phone 409 and on finding that it is not responsible, forwards information in the RSIP message to the above-described computer (also referred to as "admin" computer) 401 that performs automatic partial provisioning of phones, as illustrated by act 456 (FIG. 4B). On receiving information in the RSIP message, computer 401 performs a number of acts that need to be performed to check if phone 409 is already provisioned and if not provisioned then to automatically provision phone 409 (into a partially-provisioned state).

In several embodiments, on receiving the RSIP message information, computer 401 checks whether phone 409 has been previously provisioned (see act 457 in FIG. 4B), and if already provisioned nothing is done (i.e. the process returns to act 251 discussed above). However if phone 409 was not previously provisioned, computer 401 automatically selects (see act 458 in FIG. 4B) a telephone exchange 402J (FIG. 4A) that is to provide service to phone 409. In certain embodiments, computer 401 selects telephone exchange 402J to be whichever telephone exchange is the closest to phone 409 (in terms of distance traveled by a signal between the exchange and the phone). Note that in other embodiments, computer 401 may use other criteria in selecting a telephone exchange 402J that is to provide service to phone 409. For example, computer 401 may select any telephone exchange on a local area network (LAN) to which phone 409 is connected. In the just-described example, computer 401 may use the IP address of phone 409 to discover a specific site (and a specific local area network (LAN)) to which phone 409 belongs.

Note that telephone exchange 402J that is selected can be the same as or different from telephone exchange 402I that was used to transfer the command from phone 409 to computer 401. The only requirement in such embodiments is that both telephone exchanges 402I and 402J must be coupled to the same network as the network to which IP phone 409 is coupled. After selection of the telephone exchange, computer 401 automatically creates a record in the memory of the selected telephone exchange, in a manner similar or identical to act 202 described above, thereby to complete the first step of partial provisioning of the new phone.

In creating the record, computer 401 of some embodiments uses default values for one or more fields in the record, e.g. the value NULL for the phone number. As previously noted, such a NULL value for the phone number causes the new phone to be anonymous. For this reason, computer 401 of several embodiments enables only very limited services at the new phone: e.g. phone calls to be made to a restricted set of zero or more phone numbers. Also, because there is no phone number associated with the new phone at this stage, telephone exchange 402J of some embodiments cannot send any phone calls to the new phone. Note that the services that are to be enabled at this stage when all new phones are partially provisioned (on being plugged in) may be identified ahead of time in a default setting which can be changed by the administrator.

In several embodiments, the just-described acts by computer 401 namely checking and creating the record are performed without any involvement on part of the administrator (i.e. for each new phone being provisioned). Thereafter, some embodiments contain a branch 254 (FIG. 4B) which transitions to act 203 (described above) wherein the record that has been just created is used by the selected telephone exchange 402J in the same manner as other records in its memory, i.e. to provide service to phone 409.

Therefore, basic service (as identified in the default setting) can be obtained at a newly-plugged in phone, without involvement of an administrator, e.g. as soon as a user inserts a plug of the phone into a socket of the network (which socket may thereafter be coupled to a port of the telephone exchange). In certain other embodiments, act 459 (FIG. 4B) is performed after act 202, wherein the selected telephone exchange 402J sends IP messages periodically (also called "keep alive" messages or "heart beat" messages) to phone 409. At this stage, phone 409 can be used (as per act 203) to obtain the basic service. As previously discussed, enhanced services are made available in several embodiments only after a user personalizes their phone 409 (as per acts 205 and 206).

In certain embodiments that perform act 459, if at any time phone 409 does not receive one or more keep alive messages within a predetermined duration, then phone 409 concludes that a call agent within telephone exchange 402J that was selected by computer 401 to provide service to phone 409 has become unavailable (e.g. it may have crashed). Phone 409 may (in some embodiments) initiate a switch over process in order to use another call agent within the same telephone exchange 402J or in a different telephone exchange 402I. For example, phone 409 may reboot, thereby to generate the RSIP message which is handled in the above-described manner.

During such a switchover process, computer 401 will find that although phone 409 is already provisioned, the selected telephone exchange 402J is not available and therefore computer 401 provisions phone 409 on another telephone exchange 402I that may be available. As noted above, for the switchover process to be useful, both telephone exchanges 402I and 402J must be coupled to the same network as the network to which phone 409 is coupled. Moreover, the just-described switchover process is not supported in some embodiments.

Figure 5A:
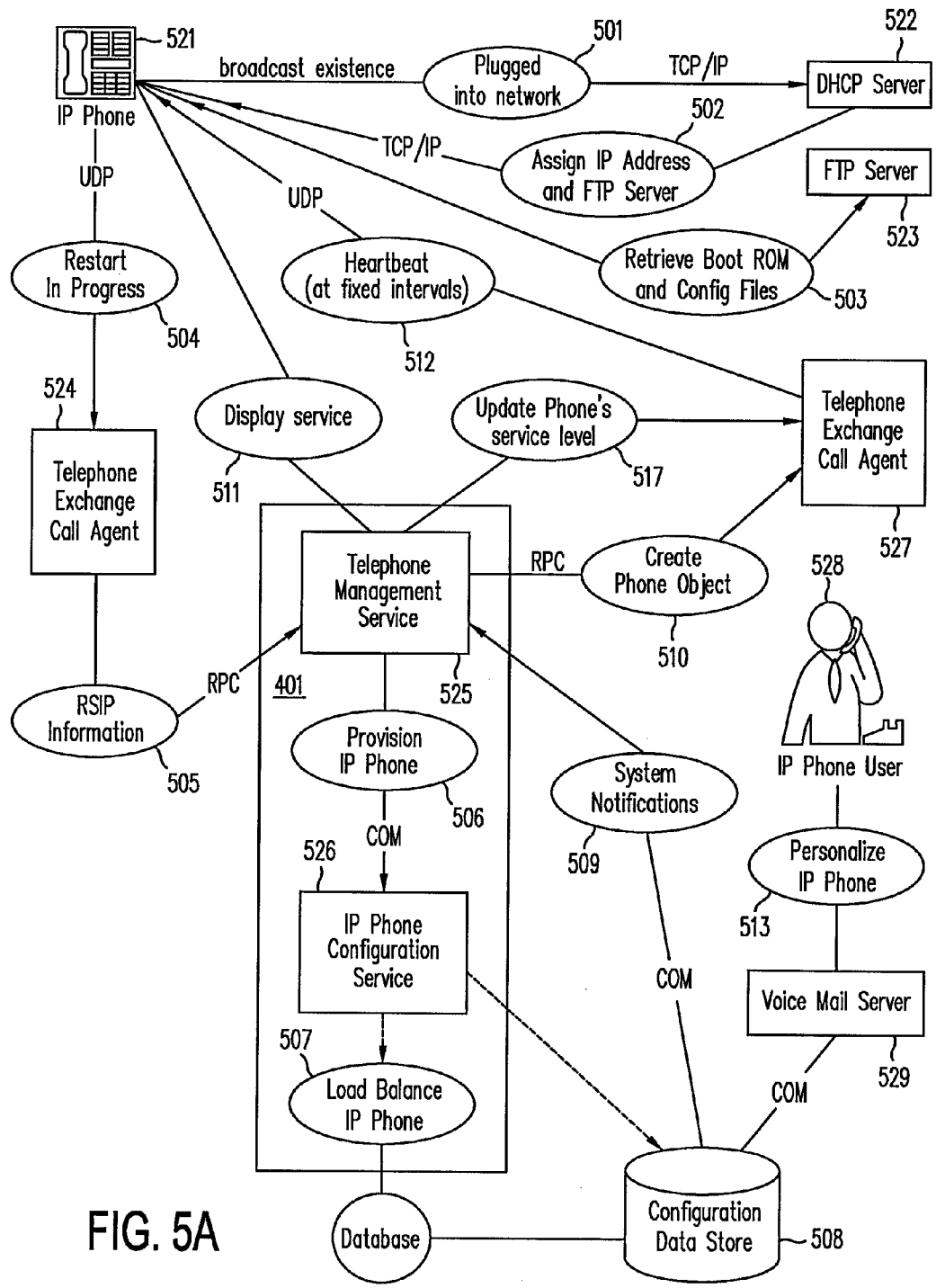
FIG. 5A illustrates, in a low-level block diagram, flow of data among several entities that are used in an illustrative programming of admin computer 401 of FIG. 4A.
Figure 5B:
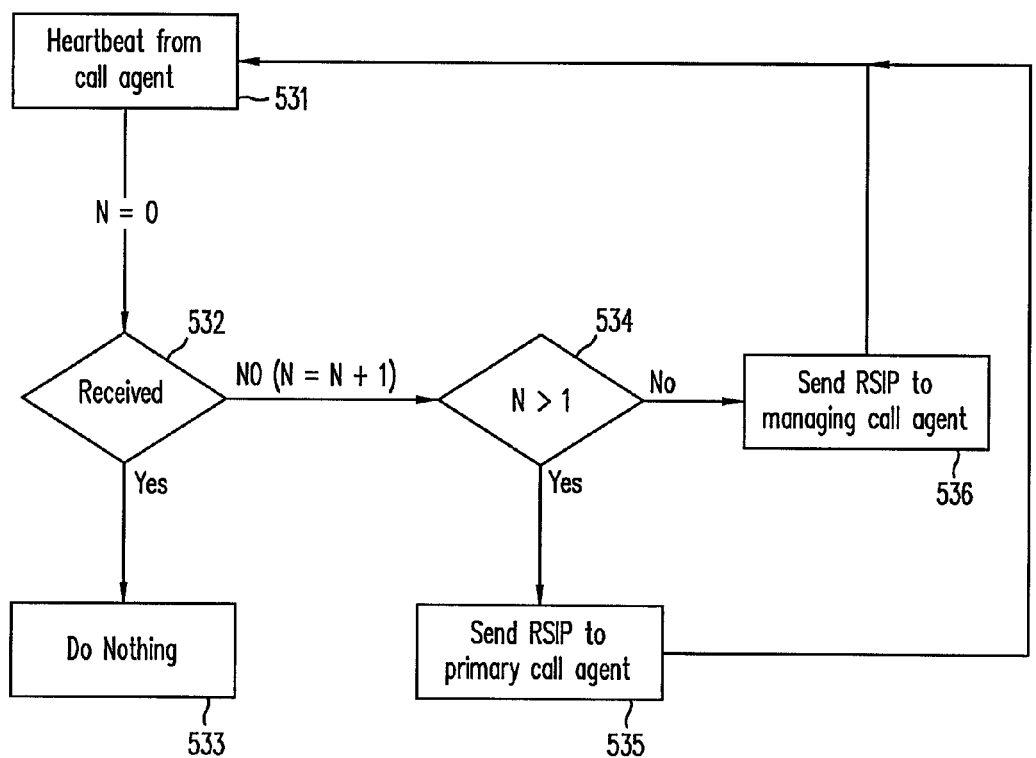
FIG. 5B illustrates, in a low level flow chart, acts performed by IP phone 521 of FIG. 5A.

One implementation of the above-described IP phone based embodiment is shown in FIGS. 5A-5E, merely as an illustration of how such an embodiment can be implemented. In FIG. 5A, a number of entities of logic (hardware and/or software or human) are illustrated as human stick FIGS. 521-529. Many of these entities 521-529 are conventional processes which have been modified to implement the invention as described herein. A number of other such implementations of the IP phone based embodiment will be apparent to the skilled artisan in view of this disclosure.

Referring to FIG. 5A, when an IP Phone 521 is plugged into an Ethernet outlet, IP Phone 521 broadcasts it's presence to the network, as illustrated by signal 501, which is a standard ARP message. A responsive signal 502 to IP phone 521 is then generated by a DHCP server 522 which assigns an IP address for use by IP phone 521, and an FTP server's IP address. Next, a signal 503 is sent by IP phone 521 to the FTP server 523, using the FTP server's IP address retrieved from the DHCP server 522. In this manner, IP phone 521 retrieves two files from FTP server 523: namely a bootrom file and a phone configuration file.

Note that signal 503 is bidirectional and therefore represents the file request as well as the file transfer. IP phone 521 then extracts the IP address of a call agent 524 from the configuration file (which was retrieved from FTP server 523). Call agent 524 may be identified in the configuration file as a primary call agent, in case two or more call agents are identified (in case the primary call agent is not available). Next, IP Phone 521 sends an MGCP command (as signal 504) in a message (in conformance with User Datagram Protocol abbreviated as "UDP" and described in RFC 768 available over the Internet at http://www.freesoft.org/CIE/RFC/768/index.htm) to primary call agent 524.

In one specific embodiment, the IP phone sends to the Call Agent a UDP message having the following header:
UDP Header {
Source Port
Destination Port
Total Length
UDP Checksum
Number of data bytes remaining
}

Note that this UDP message carries an RSIP message, and examples of the values for each field in the UDP Header are as follows:
Source Port: 0x097B
Destination Port 0x0AA7
Total Length: 120 (0x78) bytes
UDP Checksum: 0x8D1D
Number of data bytes remaining: 112 (0x0070)
RSIP message:
{
TransactionId: 1
EndpointId: PLCM__123456789012@10.1.101.1
MGCP: MGCP
Version: 1.0
RestartMethod: Restart
RestartDelay: 0
ReasonCode: 0
}

On receiving such a message from the IP phone, primary call agent 524 initially looks up its database. Since this is a new IP phone, primary call agent 524 sends a signal 505 (which contains information in the RSIP message) to an entity in computer 401 called "Telephone Management Service", with a request to provision the IP Phone. Note that call agent 524 sends signal 505 via a remote procedure call (abbreviated "RPC"). As would be apparent to the skilled artisan, RPC allows such processes to communicate with one another regardless of whether the processes are on the same machine or on remote machines.

In one specific implementation, the RPC for transferring information from a Call Agent to the Telephone Management Service uses the following structure:
struct MsgIpPhoneRestart
{
Guid idSession;
  IPAddr ipAddress;
EnetAddr enetAddress;
  EIpPhone eType;
MGCPEndPoint idMGCPEndPoint;
};

Note that all these fields except idSession originate in the RSIP message, and field idSession is inserted by the Call Agent so as to uniquely identify this session (for the current phone) from among a number of other similar sessions.

Examples of messages sent between Telephone Management Service (abbreviated as "TMS") and the Call Agent are:
MsgMediaStatsEvent
MsgUAIpPhoneInfoEvent
MsgUAPhoneEvent
MsgRequestCompletion
MsgUADestroyEvent
MsgUACreateEvent Specifically, the Call Agent fills in information and sends the message MsgMediaStatsEvent to the TMS at the completion of a call:
struct MsgMediaStatsEvent
{
Guid idSession;
Guid idUA;
SipUrl urlUA;
SipUrl urlCallID;
IPAddr ipAddressLocal;
IPAddr ipAddressRemote;
EAudioCodec eCodec;
ULONG payloadSize;
Time startTime;
EReason eReason;
ULONG sendPackets;
ULONG recvPackets;
ULONG lostPackets;
ULONG maxJitter;
ULONG underruns;
ULONG overruns;
};

Moreover, after making contact with the IP phone, the Call Agent sends a message MsgUAIpPhoneInfoEvent to the TMS, containing the following information:
struct MsgUAIpPhoneInfoEvent
{
Guid idSession;
SipUrl urlUA;
Guid idUA;
VerString sFirmwareVer;
VerString sBootRomVer;
Time tConnectTime;
BOOL bIsConnected;
IPAddr ipCallAgent;
};

Furthermore, the following messages are used in certain embodiments:
struct MsgUAPhoneEvent
{
Guid idSession;
SipUrl urlUA;
Guid idUA;
EPhoneEvent eEventType;
ULONG ulData1;
ULONG ulData2;
};

The above message is sent by a Call Agent to the TMS, when the phone is taken on/off hook. Note that on/off hook is just one example of when this message is sent.
struct MsgRequestCompletion
{
Guid idSession;
Guid idRequest;
ULONG ulStatus;
};

The above message is sent by a Call Agent to the TMS, when a call is made on the phone.

```
struct MsgUADestroyEvent
{
Guid idSession;
SipUrl urlUA;
Guid idUA;
};
```

The above message is sent by a Call Agent to the TMS, when a phone or extension is deleted.

```
struct MsgUACreateEvent
{
Guid idSession;
SipUrl urlUA;
Guid idUA;
};
```

The above message is sent by a Call Agent to the TMS, when a phone or extension is created.

When invoked, Telephony Management Service 525 parses the RSIP information, and makes a call (using an interface that conforms to Component Object Model abbreviated as "COM" specification defined by Microsoft Corporation) to another entity, namely IP Phone Configuration Service 526 to provision the IP Phone in the configuration database for the appropriate telephone exchange and call agent. When making the COM call, Telephony Management Service 525 passes to IP Phone Configuration Service 526 a number of parameters (represented as signal 506), such as the Ethernet address, IP address, MGCP Endpoint and phone type of the IP Phone.

In one specific implementation, a COM/IDL interface for transferring information from the Telephone Management Service to IP Phone Configuration Service uses the following structure:

```
interface INotifyIPCS : IDispatch
{
[id(1), helpstring("method IPPhoneRestart")] HRESULT
   IPPhoneRestart([in] BSTR in_bstrIPAddress, [in]
   BSTR in_bstrEthernetAddress,[in] BSTR in_b-
   strMgcpEndpointID, [in] LONG in_nSwitchID,EIP-
   Phone in_ePhoneType);
};
```

In several embodiments, the above interface conforms to Microsoft's Component Object Model, as described in, for example, http://www.microsoft.com/com/resources/comdocs.asp When invoked, IP Phone Configuration Service 526 uses the IP address of IP phone 521 that it received from Service 525 to discover a specific site (and a specific local area network (LAN)) to which IP phone 521 belongs. In the example illustrated in FIG. 4A, DHCP server 404 provides IP addresses in different ranges for each of different offices A, I and P. For example, DHCP server 404 may be set up to provide to all devices on LAN 411 in office A only IP addresses in a fixed range (also called "A" range), and provide IP addresses in another range (also called "P" range) to all devices on LAN 410 in office P. Similarly, IP addresses in yet another range (also called "I" range) may be provided to all devices on LAN 406 in office I.

The IP address ranges associated with each LAN are known to IP Phone Configuration Service 526. For example, IP Phone Configuration Service 526 may have access to a table that contains the following three fields: Low IP address of the range, High IP address of the range, and LAN identity. IP Phone Configuration Service 526 compares the IP address of phone 521 to see if it falls between the first two values, namely Low IP address of the range, High IP address of the range, and if so, then the third value, namely LAN identity identifies the specific LAN (and in some embodiments the specific telephon exchange) to which phone 521 is coupled.

The just-described use of an IP address of phone 521 to identify a LAN to which the phone is coupled provides the following advantages. Specifically, in several such embodiments, a phone is automatically configured for a site (which corresponds one-for-one to a switchgroup in one embodiment) at which the phone is located using a dialing plan that is unique to the site, by use of just the IP address of the phone. For example, an area code where the site is located may be included in a dialing plan for the site, so that when the user dials a 7 digit number at the newly-provisioned phone 521, then the phone automatically inserts the area code preceding the 7 digit number.

In several such embodiments, system wide there is an anonymous IP Phone users group, each outgoing trunk group needs an access code. There is also a class of services of three types: telephony (and defined as call stacked, external calls (local only, national long distance, all calls)), call permissions (and defined as internal, local, national and international), and voice mail (allowing access to broadcast distribution lists, message notifications, system distribution lists). Whenever a record for an anonymous IP phone is created in such embodiments, it takes the properties of this user group.

Moreover, if the identified LAN has a number of call agents that can be used (in one or more telephone exchanges that are coupled to this identified LAN), IP Phone Configuration Service 526 performs load balancing to identify an appropriate call agent (e.g. which has a minimum capacity ratio). For instance, a call agent could have a capacity of one hundred IP phones and has fifty IP phones installed, so the capacity ratio of this call agent is 50%, and any call agent which has the lowest value for this ratio is selected.

In an alternative embodiment, instead of the above-described table, another table may contain a direct one-to-one mapping between the IP address of the phone and the identity of a LAN to which the phone is connected, thereby to provide a similar (or identical) function.

Although multiple telephone exchanges at a single office (also called "site") have been described above as being connected to the same LAN, such telephone exchanges can be connected by other kinds of networks. For this reason, in several embodiments of the type described below, a number of co-located telephone exchanges (also called "switches") are grouped, i.e. groups are formed based on the physical location of the telephone exchanges (i.e. the site at which they are located). Such groups are also referred to below as "SwitchGroups" and are used interchangeably with the word "site" as uniquely indicating a physical location.

In the example illustrated in FIG. 4A, when phone 409 is to be provisioned, the above-described match of range (identified by its Low IP and High IP addresses) is used to select a call agent in telephone exchange 402I (instead of another call agent in telephone exchange 402J) because this call agent is currently servicing only three phones (as compared to 5 phones being serviced by the call agent in telephone exchange 402J).

Note that in the example of FIG. 4A, the availability of ports 402I2 and 402I4 is not considered during load balancing, so that these ports remain available for future use. Such ports may remain unpopulated (with hardware) which can be chosen at the time of usage, depending on whether an analog phone or an IP phone is to be supported. Note further that in this example, each port is illustrated as being able to support either one analog phone or three IP phones, although in other examples other numbers of IP phones (e.g. 5 IP phones) may be supported.

Referring to FIG. 5A, after such load balancing, IP Phone Configuration Service 526 persists the IP phone data as well as the identity of the telephone exchange and the call agent (as illustrated by signal 508) to a configuration data store (i.e. saves in non-volatile memory, such as a hard disk). Thereafter, notification signals are broadcast by a notification service 509 running on the Headquarters server, to all interested parties, indicating the identity of the telephone exchange and the call agent that are to provide service to IP phone 521.

Note that such a notification service receives events from database services, to proceed with informing all interested parties, that a particular database event has taken place. Interested parties subscribe, to be informed of particular events, with the notification server during start-up. At this time, the only interested party in such a broadcast message is Telephone Management Service 525.

On receiving such a message, Telephone Management Service 525 communicates with the identified call agent 527 and informs the call agent that it's now required to provide service to a new IP phone. In this embodiment, call agent 527 maintains information on each IP phone in an object, and therefore signal 510 from Telephone Management Service 525 is via RPC that requests creation of a new phone object. Telephone Management Service 525 also informs a display service 511 to update the IP phone's visual display, to indicate its availability as an automatically provisioned phone. Therefore, the display on IP phone 521 changes from displaying nothing (i.e. blank) to displaying the word "Available."

Moreover, by this time, a phone object has been created for phone 521 by call agent 527, and thereafter call agent 527 periodically sends to the new IP Phone 521, a message (called "heart beat" signal 512). For example, such a message may be sent at 1 minute intervals. Once the phone object is created by call agent 527, phone 521 has restricted access service, allowing only internal calls to be made from phone 521, including calls to the voice mail server (IVR). Phone 521 at this stage is also called an "anonymous" phone because there is no phone number currently associated with phone 521.

At some time thereafter, a user 528 that is to hereinafter receive phone calls at this phone 521 logs into the voice mail server and personalizes the newly configured IP phone (as per signal 513). In one specific example, user 528 presses the pound key (normally located at the bottom right corner of the keypad) on phone 521, to invoke the Voice Mail application (IVR) in the computer, and then user 528 enters their phone number and password and on doing so, the Voice Mail application (IVR) plays a voice prompt asking the user to confirm that they want to make the current phone (from which they are calling) their own phone (i.e. to be associated with the phone number that has been assigned to the user).

Therefore, the just-described personalization by user 528 is performed directly on the IP phone 521 that is to be personalized, e.g. by using a keypad that is physically attached thereto. In response to confirmation provided by user 528 (that it is this very phone 521 that is to be personalized), the voice mail server performs certain acts to assign the user's phone number to the current phone, and may also assign an enhanced service level (which identifies call permissions) to the IP phone. Specifically, the voice mail server updates a relation between the user's telephone number and the port that services the user's IP phone in the IP phone's record in the configuration data store 508, as illustrated by acts 906 and 913 in FIG. 9 (discussed below).

Thereafter, notification signals are broadcast by the notification service 509 (described above) to inform Telephone Management Service 525 of the identity of user 528 who is now associated with IP phone 521. In turn, Telephone Management Service 525 informs the above-described display service 511 to update the IP phone's visual display, to indicate personalization. Therefore, the display on IP phone 521 changes from displaying the word "Available" to displaying the user's name and extension.

As a part of signal 510 (described above for implementing RPC), Telephone Management Service 525 also communicates with the identified call agent 527, e.g. to create a phone object in the switch. Specifically, Telephone Management Service 525 informs the call agent 527 of the phone number now associated with phone 521 and also the IP Phone's call permissions (which are inherited from the group to which the user has been assigned, i.e. from the user record). At this stage, personalization of IP phone 521 is complete, and hereinafter phone 521 may be used, by the user, in the normal manner (to receive calls and to make calls).

A number of acts performed by each of the various entities, namely IP phone 521, telephone management service 525, IP Phone configuration service 526, and telephone exchange call agent 524 in one specific example are illustrated in FIGS. 5B-5F, and are described next. When IP phone 521 first comes up, it waits (in act 531 in FIG. 5B) for a predetermined time period (e.g. 1 minute) for a heartbeat signal from the call agent. At the end of the time period, IP phone 521 goes to act 532 (and during this transition sets a variable N to zero) to check if the heartbeat signal was received, and if so, goes to act 533 and loops back to act 531, to wait for the next heartbeat signal.

In act 532, if the heartbeat signal was not received, IP phone 521 goes to act 534 (and during this transition increments the variable N). In act 534, IP phone 521 checks to see if N>1 which is not true on the first pass through this act but which will be true on the next pass. Therefore, on the initial pass, the "no" branch is taken to act 536 wherein IP phone 521 sends an RSIP message to the managing Call Agent. The managing Call Agent is the Call Agent 527 (FIG. 5A) communicating with the IP Phone via heart beat. In several embodiments, an IP Phone receives an identity of who is the managing call agent in act 512 illustrated in FIG. 5A and described above. After completion of act 536, IP phone 521 returns to act 531 (discussed above).

If the pass through act 534 is a second pass, the "yes" branch is taken, from act 534 to act 535. In act 535, IP phone 521 sends an RSIP message to the primary call agent. The primary call agent is the call agent 524 which the IP Phone first communicates with for provisioning. The primary call agent 524 forwards the phone's RSIP to the telephone management service 525.

Although in some embodiments the primary call agent 524 is also the managing call agent, in other embodiments the managing call agent is different, e.g. agent 527. After completion of act 535, IP phone 521 again returns to act 531 (discussed above). The identity of the primary call agent 524 may be provided to the IP phone by an FTP server, or alternatively such identity may already be stored in the IP phone (e.g. at a factory where IP phones are manufactured).

Figure 5C:
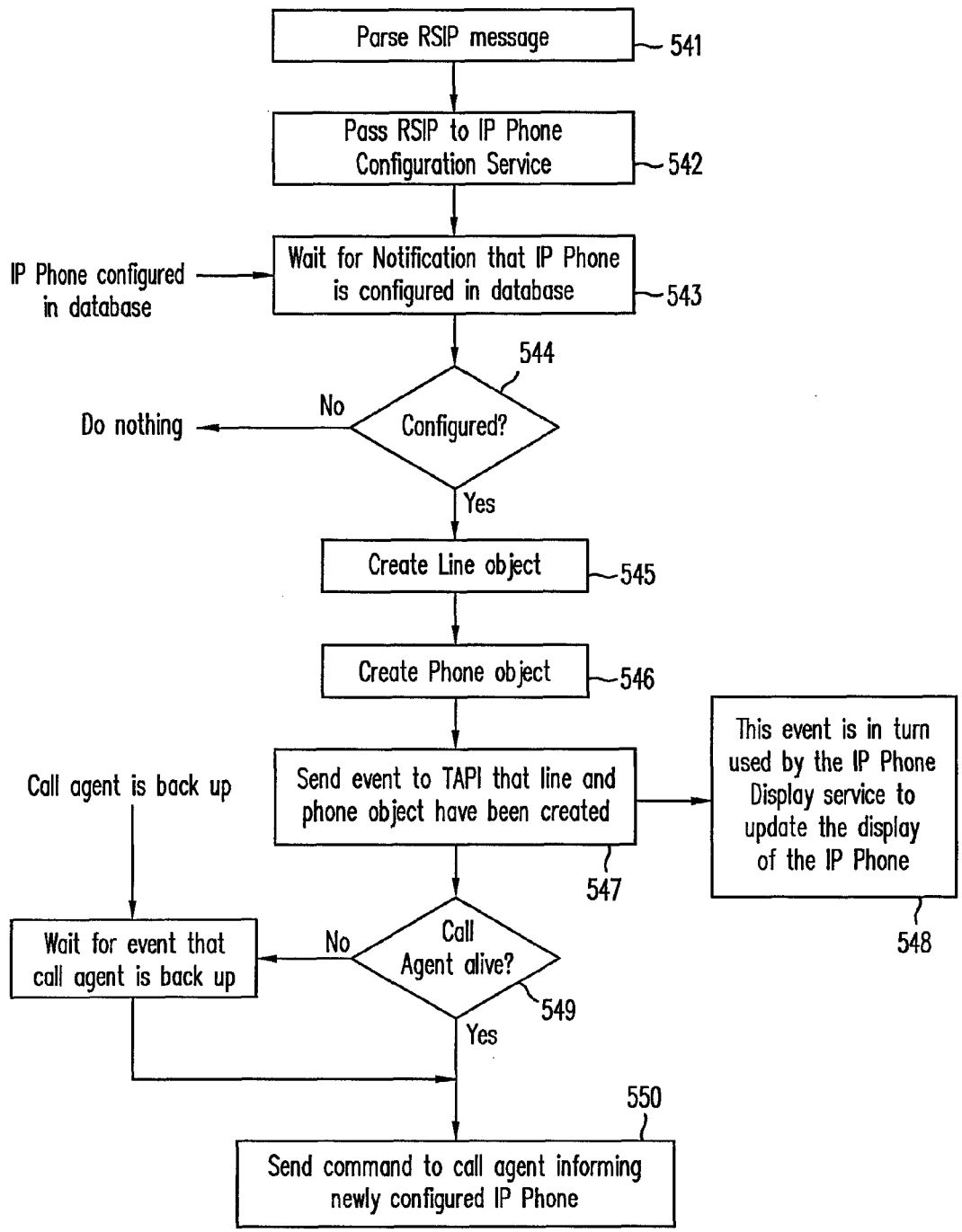
FIG. 5C illustrates, in a low level flow chart, acts performed by the telephone management service 525 of FIG. 5A which executes in the illustrative programmed computer.

Telephone Management Service 525 of one specific implementation performs act 541-550 illustrated in FIG. 5C. Specifically, in act 541, Telephone Management Service 525 receives and parses an RSIP message from an IP phone 521, and passes information from the RSIP message to the IP Phone Configuration Service 526 in act 542. In acts 541 and 542, Telephone Management Service 525 merely performs a translation of the RSIP message format into the native format needed by Phone Configuration Service 526. Thereafter, in such embodiments, Telephone Management Service 525 goes to act 543 and waits for notification that the IP phone is configured in the database.

Note that the above description of use of the RSIP message format and native format (of a storage type used internally by TMS to record the content of the RSIP message, for examples integers, strings and Booleans) are used by Telephone Management Service 526 in certain embodiments and are merely exemplary. In some embodiments, information of the type carried by the RSIP message is transmitted in other ways that will be apparent to the skilled programmer in view of this disclosure. Specifically, Telephone Management Service 525 of some embodiments maintains communications with Call Agents using an RPC protocol. Each Call Agent communicates via RPC, hence requires Telephone Management Service 525 to manage the requests to the database.

When a notification is received, Telephone Management Service 525 checks in act 544 if this particular IP phone has been configured and if not yet configured, it returns to act 543 to continue to wait. If in act 544 the IP phone has been configured, Telephone Management Service 525 goes to act 545 to create a line object, and thereafter goes to act 546 to create a phone object (described above). Note that in certain embodiments the line object contains the extension information for the line.

Next, in act 547, Telephone Management Service 525 sends an event indicating that the phone object and the line object have been created, to Telephony Application Programming Interface ("TAPI"), which is an interface defined by Microsoft Corporation and Intel Corporation. TAPI denotes an API for connecting a PC running Windows to telephone services. TAPI was introduced in 1993 as the result of joint development by Microsoft and Intel. The standard supports connections by individual computers as well as LAN connections serving many computers. Within each connection type, TAPI defines standards for simple call control and for manipulating call content.

The Telephony Server Application Programming Interface (TSAPI) defines similar capabilities for NetWare servers. In act 548, the just-described event is notified to a service that updates the display on the IP phone. This notification is done by TAPI in the admin computer 401 where Telephone Management Service 525 runs.

After performing act 547, Telephone Management Service 525 goes to act 549 to check if the call agent that is to service this IP phone is alive. Telephone Management Service 525 determines the identity of the call agent from the configuration of the IP phone. If not alive, then Telephone Management Service 525 simply waits for the call agent to come up, and when it does, goes to act 550. If the call agent is already up, then Telephone Management Service 525 goes directly to act 550. In act 550, Telephone Management Service 525 sends a command to telephone exchange call agent 524 to inform the call agent of the newly configured IP phone. As noted elsewhere herein, when so informed, the call agent provides heartbeat signals to the IP phone.

IP Phone Configuration Service 526 receives the IP address and the MAC address of a new phone to be provisioned from Telephone Management Service 525 in an act 551 as illustrated in FIG. 5D. Next, in act 552, IP Phone Configuration Service 526 searches its database for the MAC address. In act 553 the result is evaluated, and if the MAC address doesn't exist then IP Phone Configuration Service 526 determines that the phone needs to be provisioned.

In such a case, IP Phone Configuration Service 526 cycles (in act 554) through each SwitchGroup (or site) in its database to perform the following acts 555-558. Note that in this embodiment, each SwitchGroup has a one-for-one correspondence with a site. In act 555, IP Phone Configuration Service 526 checks if there are any more SwitchGroups and if so, goes to act 556 to compare the IP address of the new phone with the IP address range (i.e. the Low IP address and the High IP address) associated with this particular SwitchGroup. Next, IP Phone Configuration Service 526 goes to act 557 to check if the IP address falls in the range, and if so, transitions to act 560 to perform load balancing, which is followed by act 561 to create a new record in the database, for the new phone. In act 561, an appropriate call agent (and hence telephone exchange) is identified as providing service to the phone being provisioned.

In act 561, the new phone may also be associated with a dialing plan (e.g. including an area code) that is unique to the site (or SwitchGroup) at which the phone is located. Therefore, the phone's IP address has been used to identify a dialing plan appropriate for the phone. Note also that a new record that is created in act 561 uses as a key the Ethernet address of the phone in some embodiments. Hence in these embodiments, when the same phone is again encountered with a new IP address (but having the same Ethernet address) this phone's record is updated with a new IP address (instead of creation of a new record).

In act 557, if the IP address is not in the range, IP Phone Configuration Service 526 goes to act 558 to get the next SwitchGroup, and then transitions to act 554 (described above). If in act 555 there are no more switch groups, IP Phone Configuration Service 526 goes to act 559, and selects a default SwitchGroup (which is the SwitchGroup for the headquarters). Thereafter, IP Phone Configuration Service 526 goes to acts 560 and 561 to perform load balancing and record creation, using the default SwitchGroup. In this embodiment if all call agents at the default SwitchGroup are at full capacity (and there were no switch groups in act 555), the phone may be left unprovisioned.

In an alternative embodiment which does not implement a default SwitchGroup, if in act 555 there are no more SwitchGroups left, an error message may be generated and the phone may be left unprovisioned.

Referring back to act 553, if the IP phone identified by telephone management service 525 already exists in the database, then act 564 is performed. Note that an IP phone may already exist in the database if this phone has been moved (e.g. either at the same site or a to a different site). If this phone's IP address changes (as per DHCP), but the phone is on the same site, then the record for this phone is updated with its new IP address as per act 569. If this phone is at a different site, then there will be a change in this phone's IP address (as per DHCP), and hence a call agent is automatically found for this newly-located phone, and the record for this phone is updated with the new call agent and the new IP address as per act 561.

For this reason, it can be seen that in some embodiments, a computer of the type described herein is programmed to automatically identify a different call agent (and hence telephone exchange) for a newly-located phone in response to message (from the phone) with a new IP address. Note that a new telephone exchange is automatically identified only when the new IP address matches a new range of addresses which is different from the range of addresses that were previously found to match this phone's old IP address. If the new IP address falls within the same range as the old IP address of this phone, then the same telephone exchange is again identified.

Referring to FIG. 5D, in act 564 IP Phone Configuration Service 526 extracts from the database the previously stored IP address ("IP2") for this IP phone (for comparison with the current IP address "IP1" that is provided by Telephone Management Service 525). Note that the IP address of a given IP phone can change over time even if the phone has not been moved, e.g. if the IP phone reboots and the DHCP server provides a new IP address. In act 564, IP Phone Configuration Service 526 also extracts from the database record for the IP phone, the SwitchGroup "SG2" which identifies the site where the IP phone was previously located.

Thereafter, in acts 565 and 566, IP Phone Configuration Service 526 performs the same cycling as described above in reference to acts 554-558, to identify the SwitchGroup "SG1" indicating the site where the IP phone is currently located. Next, in act 567, IP Phone Configuration Service 526 checks if the two switch groups SG1 and SG2 are the same, and if so concludes that the IP phone is still at the same location. In such a case, IP Phone Configuration Service 526 goes to act 568 to check if the IP addresses "IP1" and "IP2" are also the same and if so nothing is done (per act 570).

But if the IP addresses are different in act 568, then IP Phone Configuration Service 526 updates the database (in act 569) with the new IP address IP1 (which indicates that the IP phone is still in the same site but has a new IP address). If the switch groups are different (in act 567), then IP Phone Configuration Service 526 concludes that the phone must have been moved to a new site. So IP Phone Configuration Service 526 uses the new SwitchGroup "SG1" to load balance (in act 560) and then update the record (in act 561).

Figure 5E:
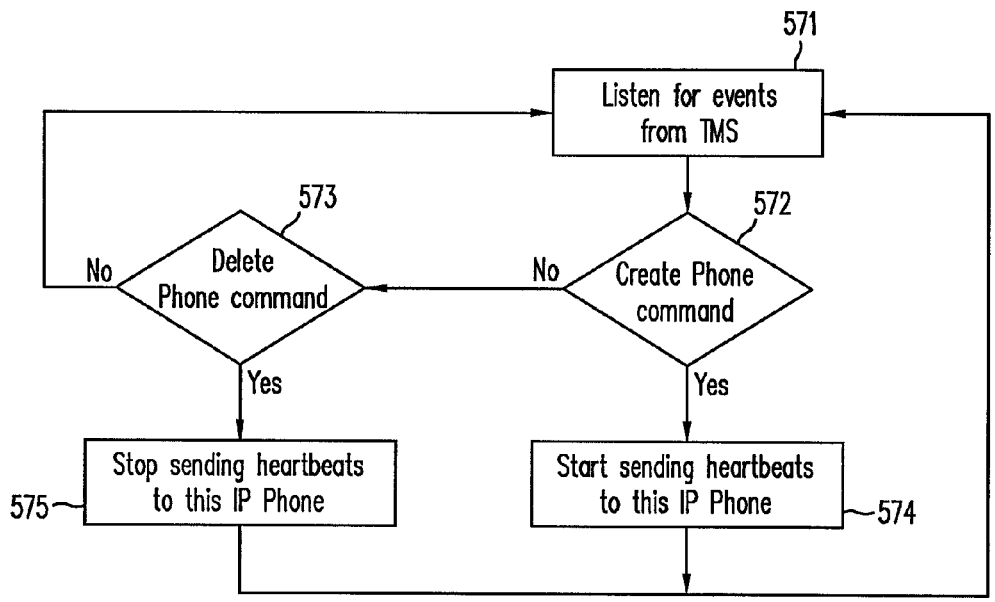
FIGS. 5E and 5F illustrate, in low level flow charts, acts performed by the telephone exchange call agent 524 of FIG. 5A which executes in a switch that performs call processing to interconnect various phones.
Figure 5F:
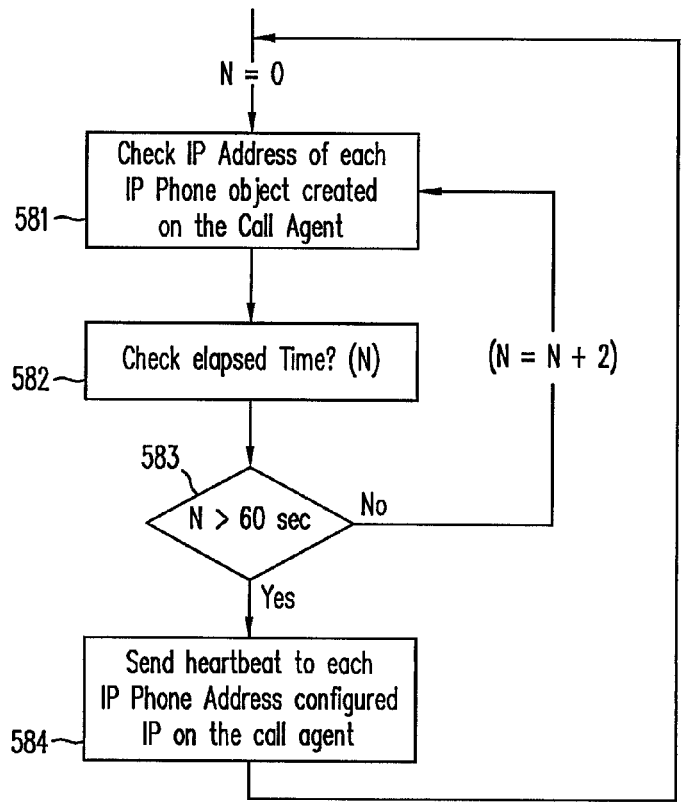

Call agent 524 contains two threads that respectively perform acts 571-575 illustrated in FIG. 5E and acts 581-584 illustrated in FIG. 5F. Specifically, in act 571, call agent 524 listens for events from Telephone Management Service 525. On receipt of an event, call agent 524 checks if the event was a command to create a phone object (in act 572), and if not, checks the event was a command to delete a phone object (in act 573), and if not simply returns to act 571. If in act 572, the event was to create a phone object, call agent 524 goes to act 574.

At this time, call agent 534 also adds the newly-configured IP phone into a list of phones to which a heartbeat signal is to be sent. Note that the thread illustrated in FIG. 5F is triggered in act 574 illustrated in FIG. 5E. In the thread illustrated in FIG. 5F and discussed below, a heartbeat signal is sent in act 584. Thereafter, call agent 524 returns to act 571 (discussed above). In act 573 if the event was a command to delete a phone object, call agent 524 removes the identified IP phone from the above-described list, and thereafter returns to act 571.

As noted above, call agent 524 also contains another thread that is triggered when act 574 in FIG. 5E is executed. This thread checks (see act 581 in FIG. 5F) the IP address of each IP phone in the above-described list. Specifically, in one example, the IP address is compared against a table maintained in the call agent. An error is returned if there is no match in the table.

Next, in act 582, call agent 524 looks up the amount of time that has elapsed, and checks this amount against a predetermined limit in act 583. For example, call agent 524 may check if more than 60 seconds have elapsed, and if not, returns to act 581 while incrementing a counter that maintains a count of the elapsed time. In act 583, if more than 60 seconds have elapsed, then call agent 524 goes to act 584. In act 584 call agent 524 sends out the heartbeat signal to each IP phone in the above-described list, and thereafter returns to act 581 (described above) while resetting the elapsed time counter.

In one particular implementation, admin computer 401 maintains a number of tables (shown in the database schema illustrated in FIG. 6) in its non-volatile memory in order to perform administrative functions, such as provisioning of a user and provisioning of a phone. Specifically, computer 401 (FIG. 4A) maintains a Users table 601 (FIG. 6) that contains a number of fields, such as the UserDN which holds the phone number assigned to the user (and "DN" stands for dialing number), the UserGroupID which holds an identity of a group to which the user has been assigned, the GuiLoginName which holds the user's first initial and last name, the GUIPassword which holds the user's password for accessing voice mail.

Such a Users table may also include, for example, the following fields: UserGroupID which defines call permissions of the user (e.g. whether or not a user can make a long distance call), and AnyIPPhone which indicates whether this user can be provisioned for an IP Phone. As noted above, when an administrator provisions a new user via screen 350 (FIG. 3C), computer 401 adds a new record to the Users table 601 (FIG. 6).

Computer 401 also maintains a Ports table 602 that contains a number of fields, such as the PortId which identifies each port uniquely within the database, SwitchID which uniquely identifies a call agent that is managing the IP phone (and this field serves as a key into the Switches table), a PortNumber which identifies a port uniquely within the switch (and this field is not used for IP phones), a PortTypeID which identifies the type of port, e.g. to distinguish a port that supports an IP phone from a conventional port that supports an analog phone. Such a Ports table may also contain the following fields:

Location: this value is configurable by the administrator; it's initialized to the name of the site.

CurrentDN: the extension of the current user assigned to the IP Phone.

HomeDN: the extension of the user (also called "home user") assigned to the IP Phone.

IPAddress: the IP Address of the IP Phone, assigned by the DHCP server.

MACAddress: the unique MAC address of the IP Phone.

MGCPEndpointID: the endpoint ID of the IP Phone.

CreationDate: the date the IP Phone was first configured into the database.

LastUpdate: the date the IP Phone was last updated in the database.

PhoneTypeID: the type of phone. (e.g. Polycom=1)

IsIPPhone: indicates that this record is an IP Phone port.

As noted above, when an IP phone is first coupled to a network, computer 401 adds a new record to the Ports table 602. Although a single port can support five IP phones, there are not 5 records one for each phone and having the same port number, because port x 5 is a logical representation of the capacity of the call agent.

In this implementation, Ports table 602 contains two UserDN fields, namely a Home DN field and a Current DN field. Home DN field contains the phone number that identifies a user permanently assigned to the phone, and Current DN field contains another phone number that identifies another user that may be temporarily assigned to the phone. The phone number in the Current DN field is used to normally transfer calls to the port that services the phone. Initially, when a new phone is automatically provisioned (on being plugged in), and a default record for the new phone is to be added to the ports table as a first step of provisioning, these two fields are left NULL. These two fields are filled in only after the second step of provisioning, i.e. when a user personalizes their phone, and at that time the same phone number is stored in both fields.

For example, when a user with phone number "ABC" (also called "first user") personalizes their phone (also called "first phone"), that user's phone number "ABC" is stored in the Home DN field and also in the Current DN field in the ports table. At this stage, provisioning (and personalization) of the phone have been completed.

After provisioning, in certain embodiments, a user with phone number "ABC" may temporarily start using a second phone of another user that has the phone number "XYZ". In such embodiments, the first user "ABC" can personalize that second phone, in the normal manner. In such embodiments, a previously-personalized second phone is being temporarily personalized another time: the second phone's Current DN "XYZ" is changed to contain the first user's phone number "ABC", and the first phone's Current DN is changed to NULL, as illustrated in the following table.

|  | Home1 | Current1 | Home2 | Current2 | Home3 | Current3 |
| --- | --- | --- | --- | --- | --- | --- |
| $1^{st}$ Phone | Null | Null | ABC | ABC | ABC | Null |
| $2^{nd}$ Phone | Null | Null | XYZ | XYZ | XYZ | ABC |

Computer 401 also maintains a DN table 603 (FIG. 6) that contains a number of fields, such as the DN which identifies each telephone number uniquely within the database. As noted above, when a new user is being manually provisioned, a number in this table which is known to be available is displayed in field 354 (FIG. 3C), thereby to allow the administrator to select an appropriate number for assignment to the user. There's another table in the database which stores digit mappings and allows the administrative tool to allocate available extensions.

Computer 401 also maintains a SwitchGroups table 604 (FIG. 6) that contains a number of fields, such as the SwitchGroupID which identifies each SwitchGroup uniquely within the database, and SiteID which provides a foreign key relationship with Sites table.

In addition, computer 401 also maintains a SwitchGroupIPAddress table 605 which is indexed by the SwitchGroupID field in the SwitchGroups table, and which contains the LowIPAddress and HighIPAddress. As noted above, when a new phone is being automatically provisioned, computer 401 cycles through the SwitchGroups, to find an appropriate SwitchGroup for use with the new phone. Computer 401 also maintains a Sites table 606 that is indexed by the SiteID field and this field is also present in the SwitchGroups table.

Computer 401 also maintains a Switches table 607 (FIG. 6) that uses a SwitchID field as the key, and a number of switches identified in this table 607 belong to a SwitchGroup which is identified by the SwitchGroupID field (which in turn is a key into the SwitchGroups table). Such a Switches table may also contain, for example, the following fields:

SwitchType: which identifies IP Phones that can only be configured on certain "SG24" call agents, and such phones are identified by a unique switch type.
SwitchGroupID: which supports a foreign key relationship with the switchgroups table.

The Switches table 607 is used in the above-described act 560 to find an appropriate switch that can provide service to the new phone that is being provisioned.

The UserGroups table 608 contains a field COSTID which contains an identifier for the class of service (e.g. whether or not long distance service is supported).

The System table 609 contains at least the following fields:
UnassignedIPPhoneUserGroupID: the usergroup all newly configured unassigned IP Phones belong to.
IPPhoneConfigurationSwitchID1: the ID of the primary call agent.
IPPhoneConfigurationSwitchID2: the ID of the secondary call agent.

Moreover, the PortTypes table 611 contains at least the field PortTypeID which provides a unique identifier to indicate that a port is an IP Port. Finally, the PhoneTypes table 610 contains at least the field—PhoneTypeID which is a unique identifier to indicate the type of IP Phone configured.

Numerous modifications, adaptations and enhancements of the embodiments, examples, and implementations are described above will be apparent to the skilled artisan in view of the disclosure. For example, in one alternative embodiment illustrated in FIG. 7, the administrator does not provision a user and instead, the users provision themselves through a screen that is similar or identical to screen 350 (FIG. 3C) but is displayed to the user, e.g. on a browser built into a display of the IP phone. Unless described otherwise, acts 701-706 and 751 illustrated in FIG. 7 are similar or identical to acts 201-206 and 251 described above, and the corresponding reference numerals are obtained by adding 500 thereto.

Figure 7:
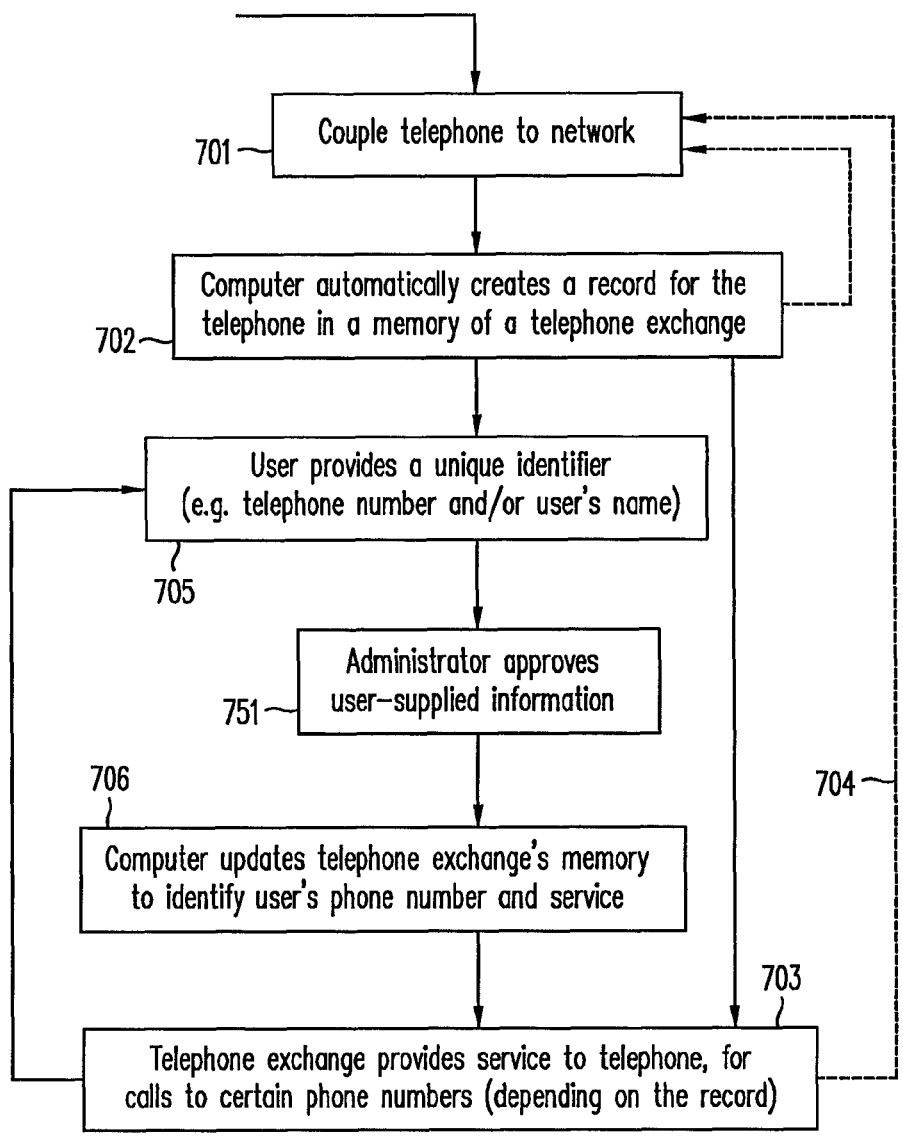
FIGS. 7 and 8 illustrate, in high-level flow charts similar to FIG. 3A, the different order of various acts in certain alternative embodiments of the invention.

In the embodiment of FIG. 7, as soon as a new phone is coupled to the network (as per act 701), a record for the phone is created in the memory of a call agent in the telephone exchange (as per act 702), and basic service becomes available at the phone (as per act 703). Thereafter, the user performs personalization (as per act 705) as described above, but in this embodiment the telephone exchange does not immediately respond. Instead, the administrator reviews and approves the user-provided information (as per act 751). In response to approval by the administrator, the computer updates the telephone exchange's memory (as per act 706), and the telephone exchange starts to provide enhanced services (as per act 703).

Therefore, in some embodiments of the type illustrated in FIG. 7, each new user may experience a delay (e.g. of one hour, half-day, or even one day) between the time the user performs the above-described actions (e.g. providing the user-specific information at the phone) and the time at which enhanced service becomes available (i.e. when the phone becomes "personalized"). However, such an embodiment does eliminate the need for an administrator to personally type in information about each user (because such information is self-entered by the user). In this embodiment, the administrator simply signs off on user-provided information, which significantly reduces the administrator's workload.

Figure 8:
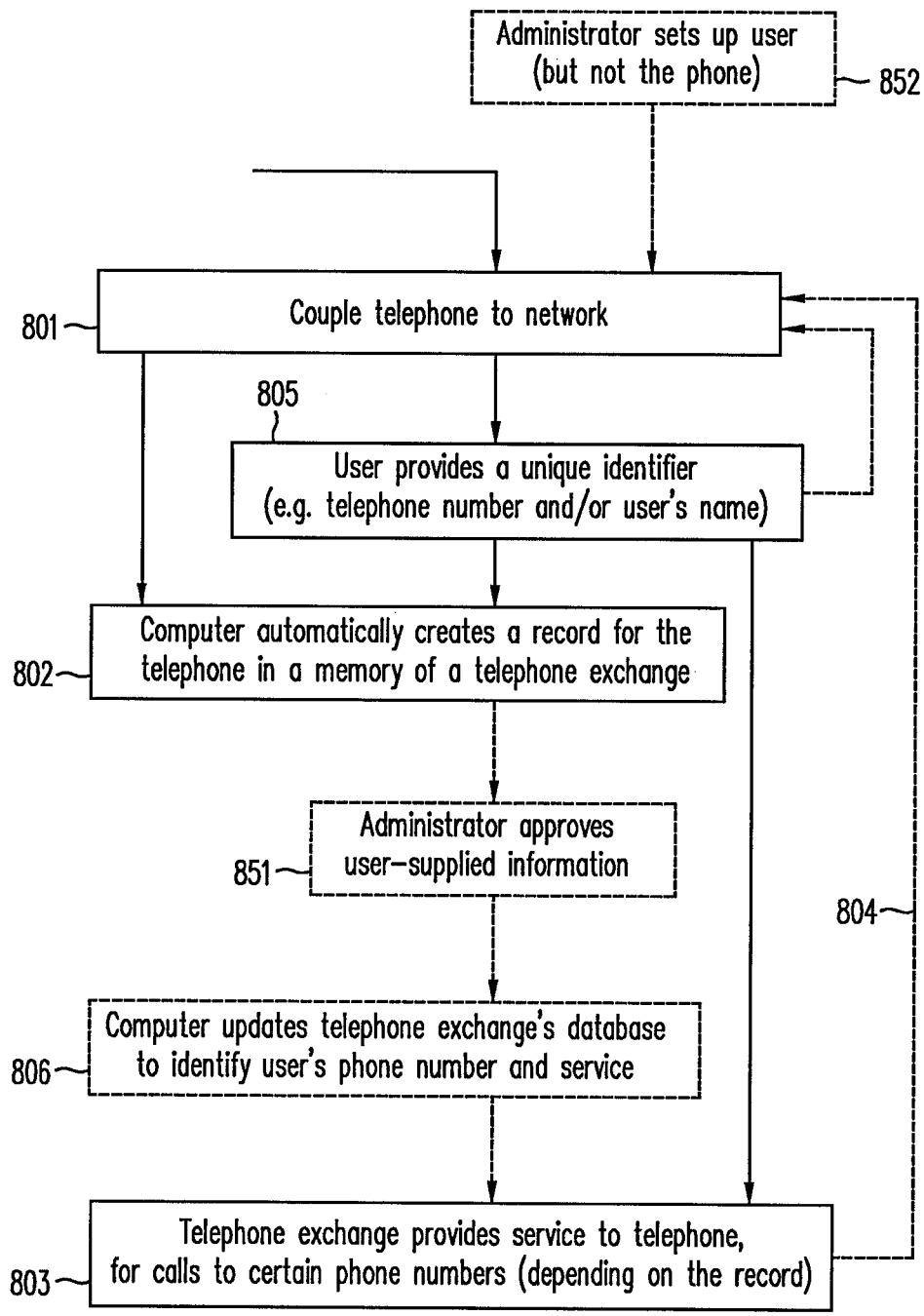

In another alternative embodiment illustrated in FIG. 8, coupling of a phone to a network (as per act 801) does not result in basic service to be provided to the phone as described above. In FIG. 8 as well, acts 801-806 and 851 are similar or identical to acts 701-706 and 851, with the corresponding reference numerals being obtained by adding 100 thereto. In the embodiment illustrated in FIG. 8, the user is required to personalize their phone (as per act 805) before the computer creates a record for the phone (as per act 802).

When the computer creates the phone's record (as per act 802 in the embodiment of FIG. 8), the record contains all information (including the phone number), and in such a case the telephone exchange provides the service (e.g. enhanced service) that is appropriate for the user (as per act 803). In two variants of this embodiment, the administrator either provisions the user prior to coupling of the phone to the network (as per act 852), or alternatively the administrator simply approves or corrects the user-provided information (as per act 851) in which case the administrator's approval must be received by the computer, and the computer must update the telephone exchange (as per act 806) before the telephone exchange will provide any service to the phone (as per act 803).

Note that in an alternative to the embodiment illustrated in FIG. 8, acts 801 and 805 are performed in the reverse order, i.e. act 805 is performed before act 801. Specifically, in such embodiments, a user does not need to exist for a phone to be provisioned.

As noted above, when a phone is initially plugged in, it is only enabled to function in a default state because only limited services are made available. To access enhanced services (and also to even receive calls at the phone), the user is required to personalize their phone. For example, the user may be required to identify themselves via their phone and/or provide a telephone number to be used in calling the user at their phone.

Figure 9:
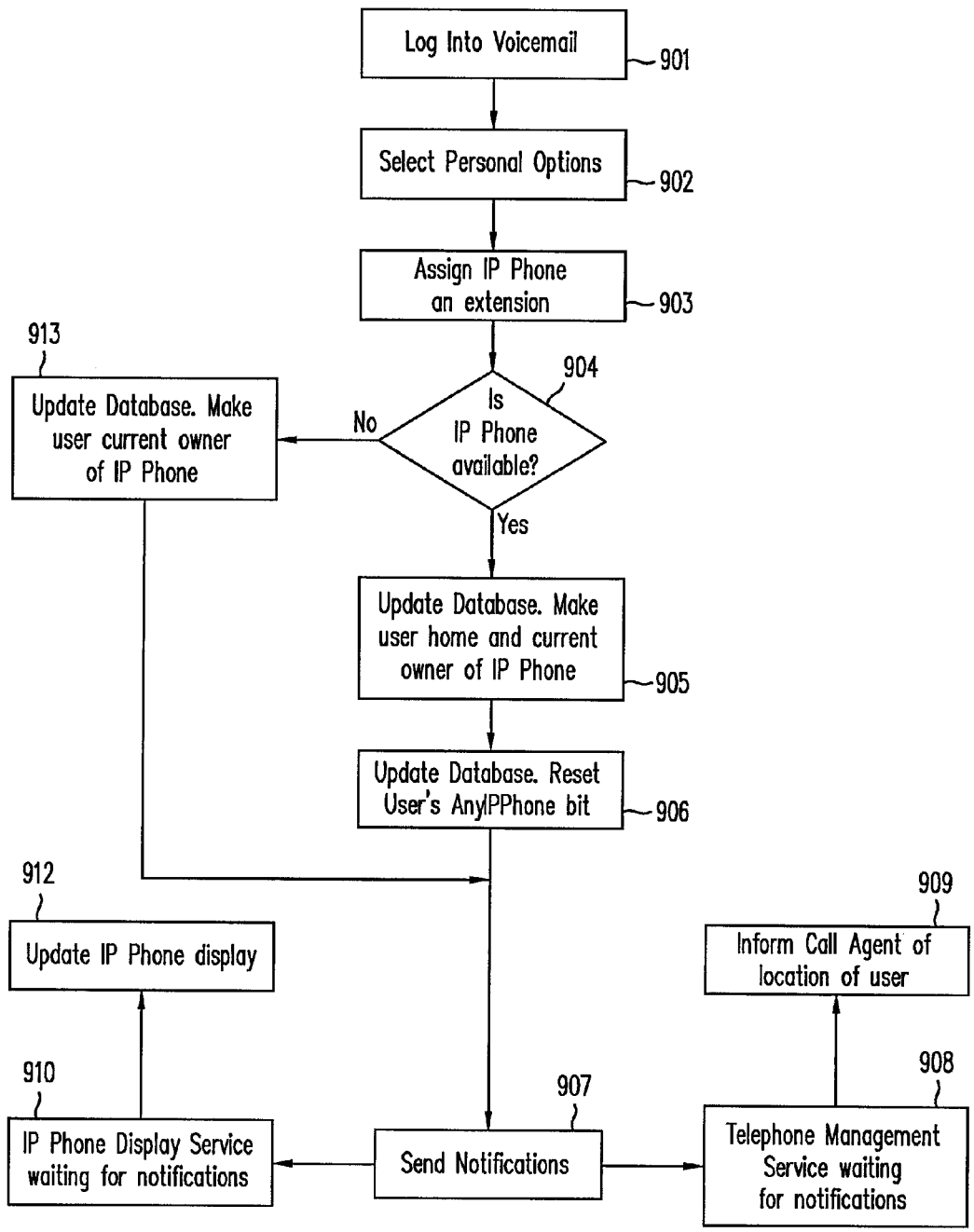
FIG. 9 illustrates, in a flow chart, acts performed to personalize a partially-provisioned phone in accordance with the invention.

Specifically in one embodiment, the user uses an anonymous phone that is to be personalized, to log into voicemail (as per act 901 in FIG. 9). On receipt of a user's login, an interactive voice response (IVR) system 529 (FIG. 5A) that implements voice mail checks to confirm that this user's name and password (which form the user's login) are authentic (e.g. by checking against the same information in a database). If so, the IVR system 529 (FIG. 5A) presents one or more options for personalization of the phone (e.g. as per act 902). In response, the user may provide a number of answers. In certain embodiments of the invention, in at least one of the answers, the user supplies an extension number that is to be assigned to the IP phone (as per act 903). This extension number was previously allocated to the user (e.g. in a user record) by the system administrator. Alternatively the extension number may be chosen by the user during the current session with IVR system 529.

The extension number supplied (or selected) by the user is saved into a persistent data store by IVR system 529 depending on the following circumstances: IVR system 529 checks (as per act 904 in FIG. 9) as to whether or not the IP phone is previously personalized. If the IP phone is displaying the message "available" then it can be personalized, and hence the IVR system 529 (also called "voice mail server") updates a relation between the user's telephone number and the port that services the user's phone. The update is done in a record for the anonymous phone in configuration data store 508, to make the user the current owner of the anonymous phone (as per act 913), e.g. the value NULL for the phone number is replaced with the extension number of the user.

Thereafter, in act 907 notification signals are broadcast by the notification service (described above) to each process that may be interested, e.g. to an IP phone display system and a telephone management system. An IP phone display service that is waiting for such a notification (as per act 909) then updates the phone's display as per act 910 (e.g. by sending changing the message to be displayed in a memory of the phone). Hence, the user has been notified (via the change in display) that the phone has been successfully personalized (and that provisioning of the phone is now complete).

Note that in the above-described embodiment, a telephone management service is also waiting for such a notification (as per act 911), and this service informs the call agent (as per act 912) about an association between: the phone (identified by its MAC address), the user (identified by their name), and a phone number to be henceforth used to route calls to the phone.

In act 904 if the answer is NO, then IVR system 529 goes to act 905 to update the database and makes the user the owner of the phone. Next, the IVR system 529 updates the database to reset a bit (called "anyIPPhone" bit) in a record for the user, indicating that personalization is now completed. Thereafter, IVR system 529 goes to act 907 (described above).

Although described in the terms of a telephone instrument that supports voice calls, as will be apparent to the skilled artisan, the invention can be used for automatically provisioning a device that supports calls using other kinds of information in addition to and/or instead of audio (depending on the embodiment). Specifically, some embodiments of the invention automatically provision devices that support video calls and/or multimedia telephone calls, e.g. of the type described in U.S. Pat. No. 5,689,553 granted to Ahuja, et al. and U.S. Pat. No. 5,999,525 Krishnaswamy, et al. each of which is incorporated by reference herein in its entirety.

Note that some embodiments implement Telephone Management Service and Display Service separate from the IP Config Service. Having multiple services makes the system more fault tolerant in such embodiments. For example, if any of the services terminates, the other services will continue responding.

Furthermore, although in certain embodiments the computer identifies a telephone exchange to be used with a phone by comparing a source address of a message to the computer (that is generated soon after the phone is plugged in) with a low address and a high address of each range of addresses available for assignment to telephones in alternative embodiments other mechanisms may be used to identify an appropriate telephone exchange. For example in some embodiments, the computer may pick a telephone exchange at random or may pick a default telephone exchange for use by all anonymous phones. In such embodiments, the computer changes the telephone exchange to be used by the phone during personalization of the phone. For example, the computer may use the user's phone number to pick the telephone exchange to be used after personalization.

Although in certain embodiments the value NULL is used for the phone number, in other embodiments different values may be used for the phone number of a phone that has been partially provisioned, without user interaction. Specifically, in some embodiments, a newly-plugged-in phone may be provisioned with an automatically-generated phone number from a predetermined range of phone numbers. For example, computer 401 may be set up by an administrator, ahead of time, to automatically generate phone numbers within the range 1535-1635 whenever computer 401 creates a new record in a telephone exchange for a newly-plugged-in phone in a first step of provisioning. In such a case, the newly-plugged-in phone can receive phone calls being made to the automatically-generated phone number, although services available at the phone are limited (based on services identified by an administrator as being default services to be provided to all anonymous phones). For this reason, such a phone (after the first step of provisioning) is also referred to as an anonymous phone.

To obtain services that are specific to a user (such as one or more enhanced services), it is still necessary, in the just-described embodiments, for a user to at least log in from the anonymous phone that is to be personalized (and in some embodiments to provide a phone number to be associated with phone being personalized as discussed elsewhere herein). During such a second step of provisioning (wherein the anonymous phone is being personalized), computer 401 of such embodiments overwrites (in the memory of the telephone exchange) an automatically-generated phone number that was saved in the first step, with the phone number to be associated with the user. As discussed above, the phone number to be associated with the user may have been provided to the user by an administrator or alternatively may be selected by the user during an interaction with the computer while performing the personalization (after the user has been authenticated).

Although in some embodiments, the user uses an anonymous phone that is to be personalized, to log into voicemail, and provides their user name and password to IVR system 529, in an alternative embodiment the user supplies such information via a graphical user interface. For example, a computer 401 may be equipped with a system 529 that generates screens for display on an IP phone. Alternatively, the IP phone itself may be programmed to display screens that obtain the user's name and password and send a message to a computer that forms an association between the phone, the user, and a phone number to be henceforth used to route calls to the IP phone.

Furthermore, although each IP phone is identified in some embodiments by a MAC address (i.e. a layer-2 address), in other embodiments each phone may be identified by any unique identifier (such as a serial number) that is programmed into a non-volatile memory of each phone, at the factory.

Therefore, numerous modifications, adaptations and enhancements of the embodiments, examples, and implementations are encompassed by the attached claims.

APPENDIX B

Configuring IP Phones

Appendix B explains how to:
  Set IP address ranges
  Assign configuration switches to support the IP phones
  Select a user group for unassigned IP phones
  Set DiffServ and TOS Quality of Service parameters
  Add IP phone users to the system
  Manage the IP phones
Setting IP Address Ranges
If your system consists of more than one site (Headquarters), you must define an IP address range
for IP phones at each site in the system. Setting ranges for each site ensures that new phones added to the system are associated with the correct site. You can also view IP Phones, by the switch supporting them, from the IP Phone Maintenance page. For more informations, see Chapter 14, Maintenance. You can view the IP address range for each site from the IP Address Map list page. The page lists the sites and associated IP address ranges. To add a site with IP phones, click the Add button and enter the information in the Site IP Address Range edit page. To delete a site from the list, click the check box to the left of the site and click the Delete button. To edit the IP address range for a site: Step 1: From the Site column, click on the site for which you are setting a range. The Site IP Address Range edit page appears. Step 2: If you are setting the IP address range for a site other than the one shown in the Site pull-down list, select it from the list. Step 3: Enter the lowest IP address in the Low IP Address text-entry field. Step 4: Enter the highest IP address in the High IP Address text-entry field. Step 5: To set the new range, click Save. You can set ranges for other sites in the system by clicking Previous or Next.

Setting IP Phones Options
IP Phones Options edit page has four configurable parameters:
  IP Phone Configuration Switch 1
  IP Phone Configuration Switch 2
  User Group for Unassigned IP Phones
  Quality of Service
IP Phones Options Edit Page Assigning Configuration Switches You need to designate a switch through which the IP phones will initially request boot files from the server. The IP addresses of these switches are downloaded to the IP phones whenever the IP phones are booted. These switches communicate with the PBX server to determine which
switch manages calls for a particular IP phone. You have the option of assigning two switches to this function, in case one switch fails. Every installation with IP phones must have at least one configuration switch.
To assign configuration switches, simply select an available switch from the pull-down lists for configuration switches 1 and 2. In a new installation, the PBX system automatically assigns the first two switches you configure as the configuration switches.
Associating a User Group with Unassigned IP Phones
Unassigned IP phones are available for users configured for Any IP Phone. From the pull-down list, select the user group that has the call permissions you want unassigned IP phones to have.
Quality of Service
The Quality of Service field on the IP Phones Options edit page can be used to enter a Types of Service (TOS) value or a DiffServ value, whichever your network currently supports.
Adding Users with IP Phones
There are two ways to add IP phone users to the system. The first method requires you to assign IP phones to each user, while the second uses the Any IP Phone feature to allow users to assign their own phone from their desktop and voice mail. Using the Any IP Phone method simplifies the setup of multiple new users. You can use either or both methods depending on your specific installation.
Adding Users with any IP Phone
To add IP phone users using Any IP Phone:
Step 1: Click Users>Individual Users from the navigation frame.
Step 2: From Add New User at Site, select the site for the new users.
Step 3: Click Go. The User edit page appears.
Step 4: Enter the information for the first user you wish to add.
Step 5: From Home Port, click IP Phones and select Any IP Phone from the pull-down list.
Step 6: From User Group, select a user group that allows extension reassignment.
Step 7: When you have finished configuring the user, click Save.
Step 8: To add more users, click Copy and repeat Step 4 through Step 7 until you have added all the new users.
Step 9: Instruct the users to log in to their voice mail from their desktop and follow the prompts. Each user's extension will automatically be assigned to the IP phone they are using. Make sure that users know which phone they should assign so that phones are not accidently assigned to the wrong users.
NOTE Any IP Phone users are assigned to the "Headquarters" site. When you assign a specific IP phone, the user will belong to the site where the IP phone is located. Only IP phones associated with the currently selected site will appear in the IP phone pull-down list.
After users have assigned their IP phones from voice mail, you can view the IP phones and users from IP Phone list page or the IP Phone Maintenance page.

Assigning IP Phones by User
You can also assign IP phones through the User edit page, one user at a time. You can assign phones by specific IP addresses or assign users to Any IP Phone according to the user's needs.
To assign an IP phone:
Step 1: Click Users>Individual Users from the navigation frame.
Step 2: From Add New User at Site, select the site for the new user.
Step 3: Click Go. The User Edit page appears.
Step 4: Enter the information for the user you wish to add.
Step 5: From Home Port, click IP Phones and either select the IP phone by IP address or select Any IP Phone. Only the IP phones in the current site will be listed. You may wish to assign some users to Any IP Phone if they will not have a permanent extension at the current site.
Step 6: Click Save.
Viewing and Editing IP Phones on the System
To help you manage the IP phones, software in a computer allows you to view and edit the IP phones on the system.
Viewing IP Phones
To view the IP phones on the system:
Step 1: Click IP Phones>Individual IP Phones from the navigation frame.
Step 2: From the By Site pull-down list, select the site that you want to view (or all sites).
Step 3: To view the IP phones connected to a specific switch, select the switch you want to view from the By Switch pull-down list. The IP phones for the sites and switches you have selected will be displayed.
IP phones can also be viewed from the maintenance screen of the computer.
You can change the name of an IP phone from the IP Phone List. By default, IP phones are listed by MAC address in the IP Phone List Name column. To change the name of an IP phone:
Step 1: Click IP Phones>Individual IP Phones from the navigation frame.
Step 2: Select your viewing options so that the IP phone or phones you want to rename are listed in the IP Phone List.
Step 3: From the Name column, click the IP phone you want to rename. A dialog box displays the information for the IP phone you selected.
Step 4: Enter the new name in the Name text-entry field.
Step 5: Click Save.
Deleting and Moving IP Phones
IP phones can be deleted from the system or moved to another site. To delete an IP phone:
Step 1: Click IP Phones>Individual IP Phones from the navigation frame.
Step 2: Select your viewing options so that the IP phone or phones you want to delete are listed in the IP Phone List.
Step 3: Click the check box of the IP phone you want to delete. WARNING Make sure that you have the selected the correct phone and that no other phones are selected.
Step 4: Click Delete. You will see a dialog box requesting confirmation.
Step 5: Click Yes to delete the phone. Click Cancel if you have selected the wrong phone.
NOTE If you wish to add the IP phone back into the system, you must reboot the IP phone. It will be reconfigured during the boot process and become available again.
To move an IP phone to a destination switch on a remote site, the remote site must have an IP address range defined. You may not move an IP phone to a switch on a remote site if the IP address of the phone is not within the IP address range of the destination site. You may move an IP phone across switches at Headquarters without entering an IP address range for Headquarters site. The IP address range restrictions are only for switches at remote sites.
To move an IP phone:
Step 1: Select the switch you are moving the IP phone(s) to from the pull-down list.
Step 2: Click IP Phones>Individual IP Phones from the navigation frame.
Step 3: Select your viewing options so that the IP phone or phones you want to move are listed in the IP-Phone List.
Step 4: Click the check box of the IP phone you want to move.
Step 5: Click Move. You will see a dialog box requesting confirmation.
Step 6: Click Yes to move the phone. Click Cancel if you have selected the wrong phone(s).

APPENDIX C

AnyPhone is a feature of a specific PBX system that lets users assign their extension to any telephone on the system, quickly and simply. When a user assigns their extension to a telephone, their entire communications profile is reassigned to that telephone. Calls placed to the user will be routed to that telephone. Calls placed from that telephone will reflect proper caller ID information. The AnyPhone feature might be used by:

Multi-Site Users, such as executives or managers, who might use the system across multiple locations. AnyPhone allows these users to pick up a telephone at any location, log into voice mail, and assign their extension to that telephone.

Office Hotel Users, such as contractors or telecommuters, who might not always be in the office or might share office space. AnyPhone allows these users to have their own extension and mailbox yet not have a dedicated switch port. They can simply assign their extension to a telephone when they are in the office.

Remote Users, such as employees in sales or support, who might travel frequently. AnyPhone allows these users to have their own extension and mailbox yet not have a dedicated switch port optimizing system resources.

AnyPhone also allows the System Administrator to configure all telephones as "Anonymous Telephones" and all users as "Virtual Users," eliminating administrative costs associated with frequent moves. When a move occurs, users simply plug in their telephone at their new location and assign their extension.

Terms used to describe AnyPhone are as follows:
Special Considerations
The following considerations apply when using AnyPhone:
To use the AnyPhone feature, the user must be in a User Group that has a Telephony Class of Service of Allow Extension Reassignment. See the "Configuring AnyPhone" section for additional information about checking the Telephony Class of Service.

PBX supports up to 1,200 virtual users which are anonymous telephones not currently assigned a user. You can make a call from an anonymous telephone, but you cannot call an anonymous telephone.
AnyPhone The feature that lets a user assign their extension to any telephone.
Assign: The command that assigns an extension to a telephone.
Assigned: The status of the user who is currently assigned to a telephone, but their home switch port is the SoftSwitch.
Current Telephone The telephone to which the user is currently assigned (also known as "Current Switch Port").

Go Home The command to assign a user's extension back to their home telephone."

Home: The status of a user who is assigned to their home telephone.

Home Telephone: The telephone to which the user is normally assigned (also know as "Home Switch Port"). This is the telephone to which the user returns when using the "Go home" command.

Unassign: The command that unassigns an extension from a telephone.

Vacated Telephone: A home telephone that currently does not have a user assigned. These are listed on the Anonymous Telephone edit page under Vacated Telephones.

Virtual User: A user that does not have a physical telephone port and is currently assigned to the SoftSwitch.

Use the following instructions to configure AnyPhone.

Step 1: Go to the Edit User page and assign a port to the user in the Home Switch Port parameter.

If you select a home switch port, the current switch port is initially defaulted to the home switch port. If you select the SoftSwitch, the system does not assign a physical switch port. This user will be a "Virtual User" until they use the AnyPhone feature to assign their extension to a telephone. If you click on Go Home, the system forces the user back to his or her home telephone. This option is useful when the user is not using his or her home phone.

NOTE Clicking on Go Home drops all calls on the current switch port and the home switch port.

Edit User Configuration Page

Step 2: Go to the Edit Telephony Features Permissions configuration page for the user group you wish to grant this privilege.

Using Anyphone

Check the Allow Extension Reassignment check box, if not already checked.

Step 3: Go to the Users List page, and verify that all users are assigned to the correct port.

Users List Page

Recall the following states of the users:

Home—The user is currently located to their home telephone.

Assigned—The user is currently located at a telephone other than their home telephone.

NOTE You can view all the anonymous telephones as well as vacated telephones on the Anonymous Telephones edit page.

Allow Extension Reassignment Check Box

After configuring AnyPhone, use the Voice Mail telephone user interface to assign and unassign an extension to any telephone. Use the client user interface to return to a home telephone.

Using the Telephone User Interface

Use the following instructions to assign an extension to a telephone.

Step 1: Log into voice mail.
Step 2: Press 7 to select Personal Options.
Step 3: Press 3 to select Assign Extension.
Step 4: Press 1 to select Assign.
Step 5: Wait for a dial tone, then hang up.
NOTE This option is only available from telephone ports, not trunk.

Use the following instructions to unassign an extension from a telephone:
Step 1: Log into voice mail.
Step 2: Press 7 to select Personal Options.
Step 3: Press 3 to select Assign Extension.
Step 4: Press 2 to select Unassign.
Step 5: Wait for a dial tone, then hang up.

NOTE: If no other user is assigned to their home telephone, their extension will automatically revert back to their home telephone. If another user is assigned to their home telephone, their extension will be assigned to the SoftSwitch until their home telephone becomes available. A user can 'kick out' the other user from the home telephone by assigning their extension from their home telephone.

Using the Telephone User Interface

Use the following instructions to assign an extension to a telephone.

Step 1: Log into voice mail.
Step 2: Press 7 to select Personal Options.
Step 3: Press 3 to select Assign Extension.
Step 4: Press 1 to select Assign.
Step 5: Wait for a dial tone, then hang up.
NOTE This option is only available from telephone ports, not trunk.

Use the following instructions to unassign an extension from a telephone:
Step 1: Log into voice mail.
Step 2: Press 7 to select Personal Options.
Step 3: Press 3 to select Assign Extension.
Step 4: Press 2 to select Unassign.
Step 5: Wait for a dial tone, then hang up.

NOTE If no other user is assigned to their home telephone, their extension will automatically revert back to their home telephone. If another user is assigned to their home telephone, their extension will be assigned to the SoftSwitch until their home telephone becomes available. A user can 'kick out' the other user from the home telephone by assigning their extension from their home telephone.

What is claimed:

1. A method of provisioning an Internet Protocol (IP) phone, the method comprising:
    the IP phone transmitting over Ethernet, an IP packet comprising a dynamically-assigned IP address;
    a computer using the dynamically-assigned IP address in the IP packet, to identify a specific site to which the IP phone belongs;
    the computer selecting a telephone exchange identified at least partially by the using the dynamically-assigned IP address in the IP packet from the IP phone;
    in response to at least one command from the computer, the telephone exchange recording in a memory, data for use in providing telephony service to said IP phone; and
    the computer associating said IP phone with a dialing plan unique to said specific site;
    wherein said dialing plan includes an area code to be automatically used by said IP phone.

2. The method of claim 1 wherein said telephone exchange is hereinafter first telephone exchange, and the method further comprising prior to the selecting, the computer determining that a second telephone exchange on which the IP phone is already provisioned is not available.

3. The method of claim 1 further comprising, the computer performing load balancing to identify a call agent to manage calls to and from said IP phone.

4. The method of claim 3 further comprising:
    prior to said transmitting, the IP phone indicating on a visual display, a first state; and
    subsequent to identification of the call agent, the IP phone updating the visual display, to indicate a second state.

5. The method of claim 4 wherein:
in the second state, no user is assigned to the IP phone; and
the visual display indicates the second state by displaying a predetermined word.

6. The method of claim 4 wherein:
in the second state, a user is assigned to the IP phone; and
the visual display indicates the second state by displaying the user's name and an extension.

7. The method of claim 1 wherein an Ethernet address of the IP phone is used as a key to create a database record, the method further comprising:
the computer updating the database record with a second IP address, in response to receipt of another IP packet with the second IP address, from said IP phone.

8. The method of claim 7 further comprising:
finding a new call agent for the IP phone if the IP phone is at a different site when said IP phone is encountered with the second IP address; and
updating the database record to identify the new call agent.

9. The method of claim 8 wherein:
the new call agent is at a new telephone exchange selected by said computer, based on the second IP address.

10. The method of claim 1 wherein the IP packet indicates the IP phone is being taken in or out of service, the method further comprising:
a call agent in the telephone exchange sending a heartbeat signal to the IP phone; and
if the heartbeat signal is not received after a predetermined time period from said transmitting, the IP phone further transmitting an additional packet indicating the IP phone is being taken in or out of service.

11. The method of claim 1 further comprising, subsequent to the telephone exchange being selected:
the computer persisting an identity of the telephone exchange and data related to the IP phone to a configuration data store.

12. The method of claim 1 further comprising, subsequent to the telephone exchange being selected:
the computer broadcasting an identity of the telephone exchange that is to provide service to the IP phone, to a plurality of interested parties.

13. The method of claim 1 wherein:
said at least one command comprises a remote procedure call (RPC) from the computer to the telephone exchange, to request creation of a new phone object.

14. The method of claim 13 wherein:
the memory comprises data for a plurality of phone objects comprising the new phone object; and
data for each phone object in the plurality of phone objects, comprises an IP address and an Ethernet address.

15. The method of claim 14 wherein:
the data for each phone object further comprises a type of said IP phone.

16. The method of claim 1 further comprising:
the computer identifying, from among multiple call agents, a selected call agent to manage calls to and from said IP phone; and
the computer informing the selected call agent about an association between at least the IP phone and a phone number to be henceforth used to route calls to the IP phone.

17. The method of claim 1 wherein, during the telephone exchange being selected:
the computer compares the dynamically-assigned IP address with a low address and a high address of each range of addresses available for assignment to IP telephones; and
the computer uses a matching range resulting from comparison, to identify the telephone exchange.

18. The method of claim 17 wherein:
the computer automatically identifies a different telephone exchange in response to another IP packet from said IP phone with a different IP address, wherein said different IP address matches a different range of addresses.

19. A system comprising:
an Internet Protocol (IP) phone comprising means for transmitting over Ethernet, an IP packet comprising a dynamically-assigned IP address;
a computer coupled to the IP phone, the computer comprising means for using the dynamically-assigned IP address in the IP packet, to identify a specific local area network (LAN) to which the IP phone is connected, the computer further comprising means for selecting a telephone exchange on the specific LAN identified by the using of the dynamically-assigned IP address in the IP packet from the IP phone; and
a telephone exchange coupled to the computer and to the IP phone, the telephone exchange comprising a switch memory, the telephone exchange further comprising means responsive to at least one command from the computer, for recording in the switch memory, data for use in providing telephony service to said IP phone.

20. A system for provisioning an Internet Protocol (IP) phone, the system comprising at least one computer, the system comprising:
means for using a dynamically-assigned IP address comprised in an IP packet received from the IP phone, to identify a specific site to which the IP phone belongs;
means for recording in a memory, data for use in providing telephony service to said IP phone; and
means for associating said IP phone with a dialing plan unique to said specific site;
wherein said dialing plan includes an area code to be used by said IP phone.

21. The system of claim 19 wherein said telephone exchange is hereinafter first telephone exchange, wherein:
the computer comprises means for determining that a second telephone exchange on which the IP phone is already provisioned is not available.

22. The system of claim 19 wherein:
the computer comprises means for performing load balancing to identify a call agent to manage calls to and from said IP phone.

23. The system of claim 19 wherein:
the computer comprises means for identifying, from among multiple call agents, a selected call agent to manage calls to and from said IP phone; and
the computer comprises means for informing the selected call agent about an association between at least the IP phone and a phone number to be henceforth used to route calls to the IP phone.

24. The system of claim 19 wherein:
the computer comprises means for comparing the dynamically-assigned IP address with a low address and a high address of each range of addresses available for assignment to IP telephones; and
the computer comprises means for using a matching range resulting from comparison, to identify the telephone exchange.

25. The system of claim 24 wherein:
the computer comprises means for automatically identifying a different telephone exchange in response to another IP packet from said IP phone with a different IP address, wherein said different IP address matches a different range of addresses.

26. The system of claim 20 further comprising:
means for determining that a telephone exchange on which the IP phone is already provisioned is not available.

27. The system of claim 20 further comprising:
means for performing load balancing to identify a call agent to manage calls to and from said IP phone.

28. The system of claim 20 further comprising:
means for identifying, from among multiple call agents, a selected call agent to manage calls to and from said IP phone; and
means for informing the selected call agent about an association between at least the IP phone and a phone number to be henceforth used to route calls to the IP phone.

29. The system of claim 20 further comprising:
means for comparing the dynamically-assigned IP address with a low address and a high address of each range of addresses available for assignment to IP telephones; and
means for using a matching range resulting from comparison, to identify a telephone exchange.

30. The system of claim 29 further comprising:
means for automatically identifying a different telephone exchange in response to another IP packet from said IP phone with a different IP address, wherein said different IP address matches a different range of addresses.

31. The system of claim 20 further comprising:
means for updating a database record with a second IP address, in response to receipt of another IP packet with the second IP address, from said IP phone.

32. The system of claim 31 further comprising:
means for finding a second dialing plan for the IP phone if the IP phone is at a second site when said IP phone is encountered with the second IP address.

33. A method for provisioning an Internet Protocol (IP) phone, the method comprising:
using a dynamically-assigned IP address comprised in an IP packet received from the IP phone, to identify a specific site to which the IP phone belongs;
recording in a memory, data for use in providing telephony service to the IP phone; and
associating the IP phone with a dialing plan unique to the specific site;
wherein the dialing plan includes an area code to be used by the IP phone;
wherein the using, the recording and the associating are performed by at least one computer.

34. The method of claim 33 further comprising:
determining that a telephone exchange on which the IP phone is already provisioned is not available.

35. The method of claim 33 further comprising:
performing load balancing to identify a call agent to manage calls to and from said IP phone.

36. The method of claim 33 further comprising:
identifying, from among multiple call agents, a selected call agent to manage calls to and from the IP phone; and
informing the selected call agent about an association between at least the IP phone and a phone number to be henceforth used to route calls to the IP phone.

37. The method of claim 33 further comprising:
comparing the dynamically-assigned IP address with a low address and a high address of each range of addresses available for assignment to IP telephones; and
using a matching range resulting from comparison, to identify a telephone exchange.

38. The method of claim 37 further comprising:
identifying a different telephone exchange in response to another IP packet from said IP phone with a different IP address, wherein said different IP address matches a different range of addresses.

39. The method of claim 33 further comprising:
updating a database record with a second IP address, in response to receipt of another IP packet with the second IP address, from said IP phone.

40. The method of claim 39 further comprising:
finding a second dialing plan for the IP phone if the IP phone is at a second site when said IP phone is encountered with the second IP address.

41. The method of claim 33 further comprising:
identifying a different telephone exchange in response to another IP packet from said IP phone with a different IP address.

* * * * *